Sept. 17, 1963 C. A. RAYMOND 3,103,847

CAPTURE-TYPE COMBINATION ACTION FOR ORGANS

Filed April 10, 1959 7 Sheets-Sheet 1

FIG. I

INVENTOR
CHESTER A. RAYMOND
Franklin Mohr
ATTORNEY

Sept. 17, 1963 C. A. RAYMOND 3,103,847

CAPTURE-TYPE COMBINATION ACTION FOR ORGANS

Filed April 10, 1959 7 Sheets-Sheet 4

INVENTOR
CHESTER A. RAYMOND
Franklin Mohr
ATTORNEY

CAPTURE-TYPE COMBINATION ACTION FOR ORGANS

United States Patent Office 3,103,847

Patented Sept. 17, 1963

3,103,847
CAPTURE-TYPE COMBINATION ACTION FOR ORGANS

Chester A. Raymond, 37 Palmer Square W., Princeton, N.J.

Filed Apr. 10, 1959, Ser. No. 805,455
19 Claims. (Cl. 84—345)

This invention relates to organ actions and more particularly to capture-type combination actions used in connection with pipe organs or electronic organs.

Capture-type combination actions for organs typically include, in addition to the keys, a stop tablet (control) for each stop, a series of manual pistons, and a setter button.

Before playing the organ, the organist normally desires to pre-set the action so that individual manual pistons are capable of controlling a selected plurality of stops. When the action has been thus pre-set, the manual pistons may be said to have "captured" these stops. These setting functions, and the components within the action which perform them, are sometimes referred to as the "setting side."

Then, when the organist wishes to operate the captured stops associated with a particular piston, he depresses that piston. This shifts these captured stops, and their tablet controls, to the "on" position if not already "on," and places or leaves all other stops, and their tablet controls, in the "off" position. Now when the keys are played, the tones controlled by the capture stops will be heard. This shifting of the stops, with the aid of the piston, and the components within the action which perform this function, are sometimes referred to as the "operating side."

The invention is an improvement over the capture-type combination action disclosed and claimed in my copending application Serial No. 566,499, now Patent No. 2,954,716, filed Feb. 20, 1956.

In common with the copending application, the present application describes a system in which the trace bar performs both setting and operating functions.

An object of the present invention is to further simplify and improve organ combination actions.

Features of the invention include an improved form of contactor and an improved relationship of contactor and trace bar, to perform the "setting-on" function in presetting selected combinations of stops. The improved contactor is in the form of a forked spring of resilient material and may be made, for example, of wire bent double to form a shank portion and having two tines which are somewhat spread apart. Instead of being supported at one end only, the improved contactor is supported by the shank portion and by one tine, the other tine being operatively associated with the trace bar. A plurality of crossbars preferably made of conductive material, are provided, extending perpendicularly to the trace bars and spaced apart therefrom. The supporting members for the trace bars are each provided with a longitudinally extending insulating portion containing holes or sockets for receiving one tine of each forked contactor. Slots are provided in the crossbars for receiving the shank portion of the contactor. In the group of contactors associated with a single crossbar, each contactor has a tine secured to a different one of the trace bar supporting members, each contactor being thus associated with a particular trace bar. Each trace bar is associated with a plurality of contactors, one for each of the crossbars. The shank of the contactor is inserted into the slots in the crossbar from the underneath side of the crossbar. Due to the resilience of the material of which the contactor is made, the contactor is readily inserted in place by slightly flexing the contactor while inserting the tine into the socket-like hole in the trace bar support member and the shank portion into the slots in the crossbar. No soldered connections are required. The unsecured tine of the contactor is adapted to press against one side or the other of the insulating portion of the trace bar mechanism or to stand free of the trace bar, as required by the setting and operating procedures. The crossbar is preferably tubular in form and slotted top and bottom. The slots at the top are only slightly elongated, to accommodate and hold the shank of the contactor. The bottom slot is preferably continuous from near one end of the crossbar to near the other end, leaving unslotted portions at both ends of the crossbar to promote rigidity. The material of the contactor is preferably of rectangular cross-section and should fit fairly snugly in the slots to prevent rotation of the contactor while permitting flexure. The spring contactors are readily fabricated in a manner similar to the making of metal hairpins. These contactors are very stable and reliable in action and constitute a distinct improvement over wires fastened at one end only.

Another feature of the invention is the provision of automatic holding means on the setting side which make it possible for the organist to release the setter button in a setting or capturing operation immediately after he presses a manual piston, thereby providing a novel interaction of setter button, piston and tablet controls. Heretofore, it has been necessary to hold down both the setter button and a piston during the entire setting operation. This meant that the organist had to complete the desired combination of stops, by setting the stop tablets to the "on" or "off" position as desired, before pressing the setter button. The introduction of the holding means enables the organist, after pressing the setter button and depressing a selected one of the manual pistons, to release the setter button, thus giving him one hand free. The improved action is so arranged that the organist may then make any desired rearrangement in the combination of stops while he holds the piston down with one hand and manipulates the stop tablets with the other hand. With his free hand he may also, if he so desires, play a chord or so to test the musical effect of the combination he has tentatively selected. He may then add or subtract stops at will. When he is satisfied with the effect produced he may complete the setting operation by releasing the piston. This feature of the system may be used either in pre-setting the organ or even while playing and is not found in prior capture-type systems that are fully automatic in operation. While manual devices have been used to lock the setter button, that solution requires that the organist remember to unlock the button when he has finished the setting process. To effect the desired holding function in accordance with the invention, a plurality of holding contactors are provided, each adjacent to a trace bar. When the setter button is pressed and held, the trace bars are unlocked and, in addition, a holding circuit is conditioned. When any manual piston is subsequently depressed, the associated trace bar starts to move and almost immediately makes an electrical contact with the associated holding contactor, thereby serving to complete the above mentioned holding circuit, which puts a second connection across the contacts that are bridged by the setter button. Consequently, the setter button may then be released. Holding the manual piston down is now equivalent to holding down the setter button as well. When the piston is released, the holding action continues in effect until close to the end of the return stroke of the trace bar, thus assuring positive completion of the setting operation before the holding circuit is broken. Without this holding feature it would be possible for the organist accidentally to release the setter button before releasing the piston. In that case, the movement of a crossbar could cause a contactor to shift from the "on" condition to the "off" condition thereby dropping out a stop that had been selected by the organist for inclusion in the combination to be set. Or, even if no error in setting was produced, the premature motion of the crossbar could still set a contactor into vibration which might cause the contactor to be caught upon the edge of the trace bar, thus jamming the action.

A further feature of the invention is an auxiliary magnetic armature associated with the "on" coil for opening the energizing circuit of the "off" coil at certain times when the operation of the "off" coil might interfere with positive movement of the main armature. This arrangement provides a novel interaction involving the "on" and "off" coils and the stop tablet assembly.

A still further feature is an alternative arrangement whereby there is a double use of the "off" coil in which on the setting side this coil takes over the function of the crossbar shifting magnet in addition to its normal function. For this purpose, an auxiliary armature is attached pivotally to the main armature of the console stop action unit in the vicinity of the "off" coil. This auxiliary armature is movable by means of the "off" coil when the console stop action unit is in the "on" position. The motion of this auxiliary armature may be used to shift the crossbar during the setting operation. In this embodiment, to set a stop "on," both "off" and "on" coils of the stop action magnet are energized at the same time. The main armature of the stop that is down is in the magnetic field of the "on" coil, leaving the "off" coil magnet free to attract the auxiliary armature, thereby moving the crossbar member. Since the ordinary function of the "off" coil is confined to the operating side, there is no conflict between the two functions. The auxiliary armature may be coupled mechanically directly to the crossbar. This arrangement enables the combination action to be mounted immediately behind the console name board and is particularly advantageous in the smaller installations, because it eliminates the stop action magnet required in the remote action.

Other features include:

(1) A unitary restoring means serving both the trace bar proper and a slider mounted upon the trace bar.

(2) An adjustable spring clip for mechanical coupling between movable members, replacing the usual leather buttons on a threaded rod commonly employed in the organ art.

(3) A cam follower comprising a screw having a smooth shoulder.

(4) A biasing spring inserted in the split end of a crossbar for restoring the crossbar to normal position after it has been shifted.

(5) The piston magnets are located in a separate portion of the device with no rigid mechanical connection with the remainder of the action. Consequently, the two parts of the action may be readily separated for inspection or repair.

(6) A solid lock member or bumper is used in place of a slidable notched member. The lock member is cammed up and down. The result is a simpler and more economical locking arrangement.

The invention provides a compact, unitary assembly which may be used singly or in multiple to accommodate installations of various sizes. It eliminates the need for designing a special combination action to suit each organ.

The several novel features of the invention, moreover, co-operate in a novel manner to provide an improved capture-type combination action.

The system of the invention has particular inherent advantages when it is desired to provide means to cancel simultaneously all the stops of a given group, or of several groups, or even to cancel all the stops in the organ.

Other features, objects and advantages will appear from the following more detailed description of an illustrative embodiment of the invention, which will now be given in conjunction with the accompanying drawings.

In the drawings,

FIG. 16 is similar to FIG. 15 except that the third spring contactor is set on;

Figures 2, 3, 21, 22, 24:
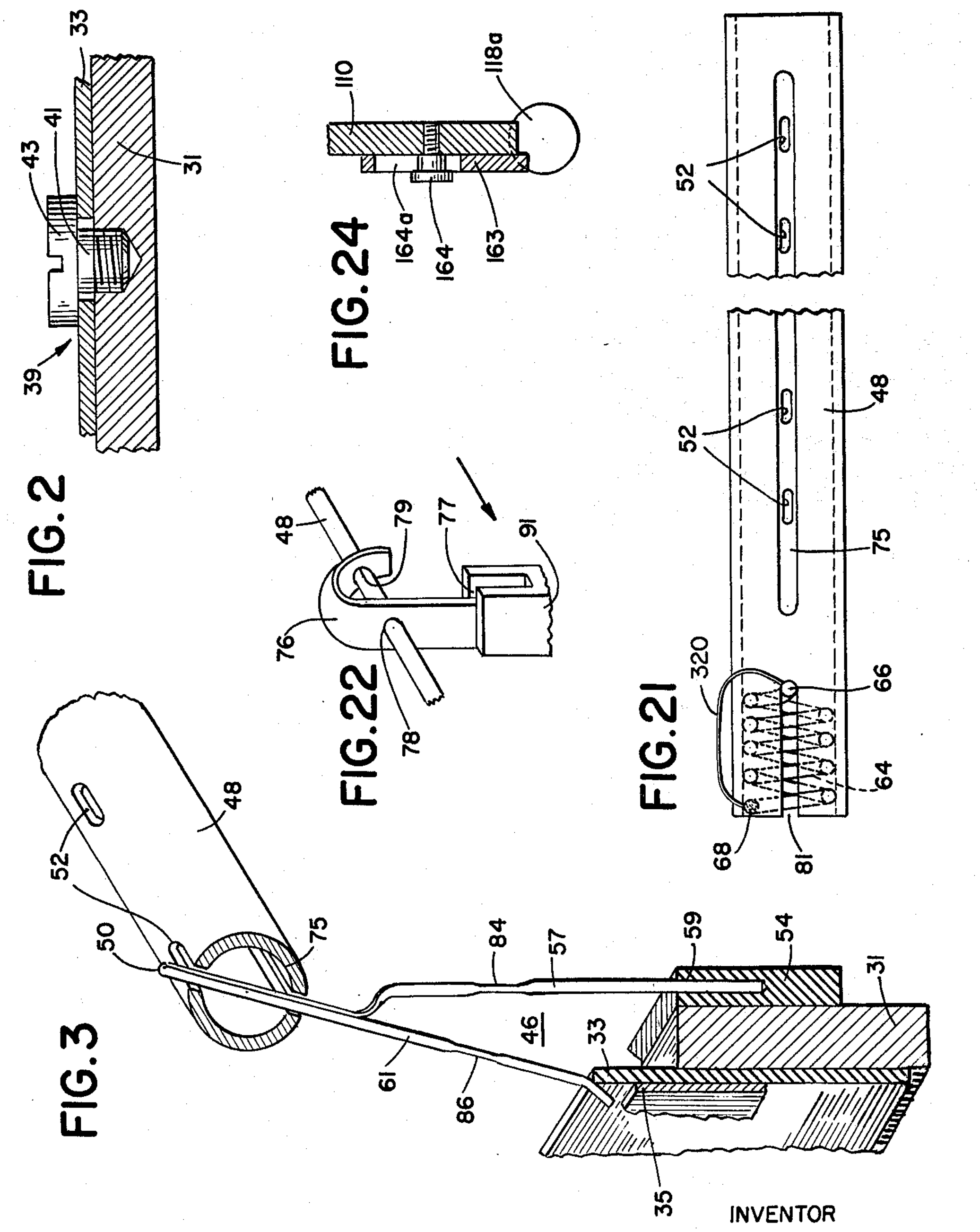
FIG. 2 is an enlarged fragmentary cross-sectional view of means for slidably fastening a trace bar to a support member by means of a suitable screw.
FIG. 3 is an enlarged perspective view of a forked spring contact member showing an improved arrangement for supporting the contact member in operative relationship to a crossbar and a trace bar.
FIG. 21 is an enlarged bottom plan view of a preferred embodiment of a crossbar for use in the system of the invention.
FIG. 22 is a slightly enlarged perspective view of an improved adjustable mechanical coupling between a cross-bar shifting magnet and a crossbar.
Figures 23, 25:
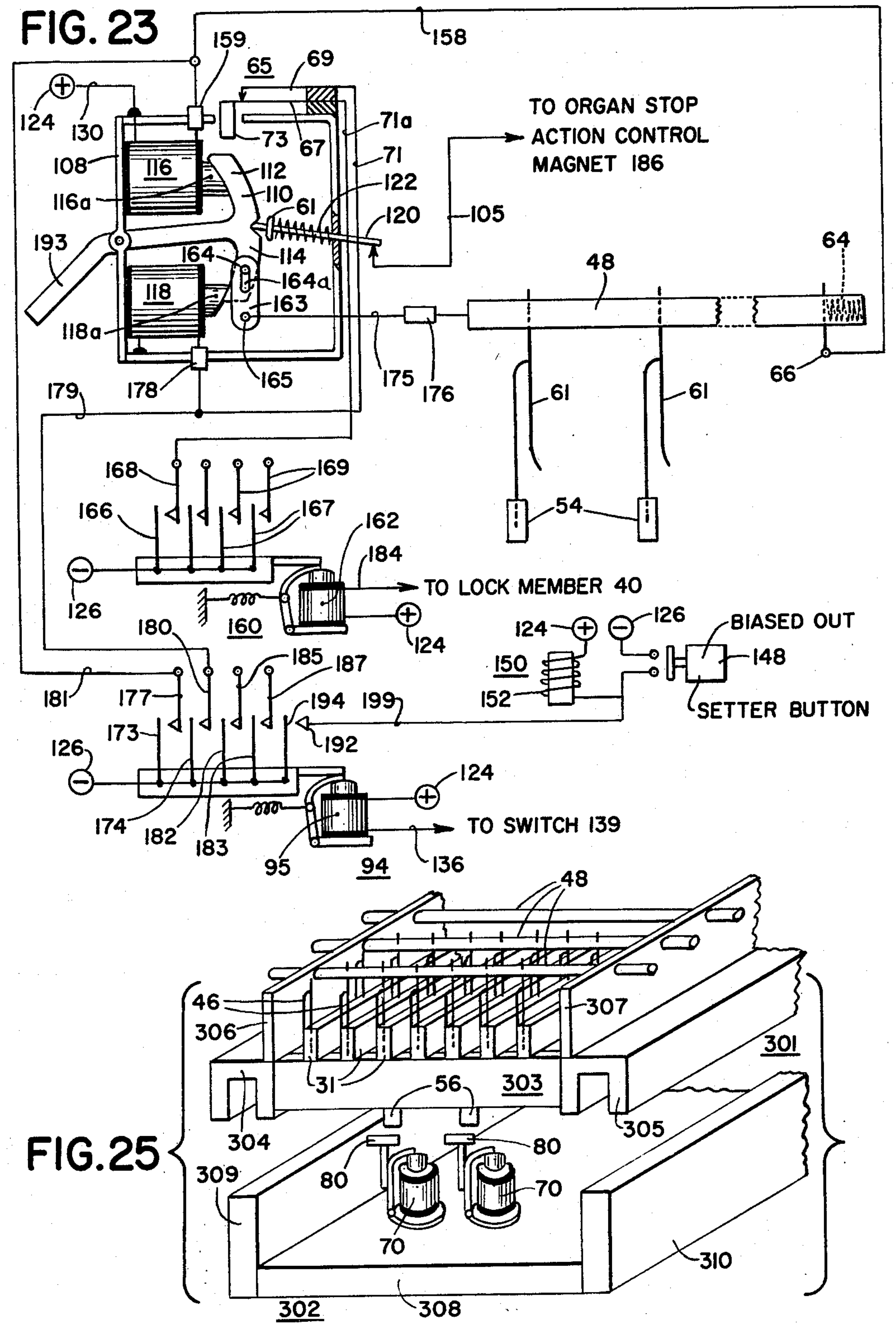
FIG. 23 is a schematic diagram of a portion of a capture-type combination action for mounting immediately behind the console name board, showing an alternative arrangement for shifting a crossbar, and providing means for direct mechanical coupling between a console stop action unit and a crossbar.

FIG. 24 is a fragmentary, detailed view of a mechanical blocking arrangement used in the system of FIG. 23; and FIG. 25 is an exploded general perspective view of a preferred embodiment of a capture-type combination action in accordance with the invention, suitable for mounting either immediately behind the console name board or at a more remote location, many details being omitted for the sake of clarity.

Figure 1:
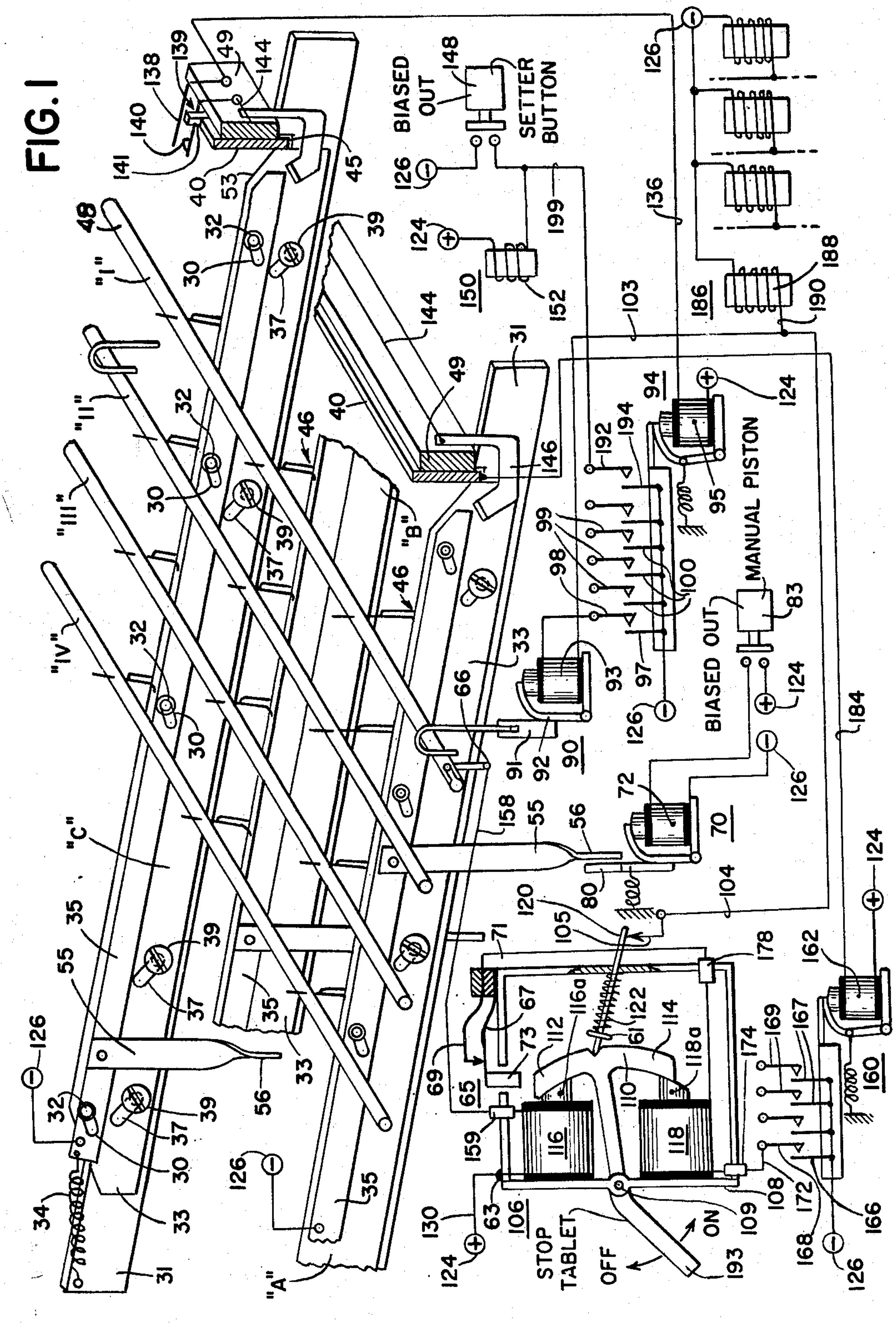
FIG. 1 is a diagram mainly schematic, and with certain portions in perspective, of a capture-type combination action for an organ, showing an illustrative embodiment in accordance with the invention.

In FIGURE 1 there is shown a rectangular metal bar support member 31, a trace bar 33 comprising a strip of insulating material movably carried by the support member 31, and a slider 35 comprising a strip of conductive material movably mounted on the trace bar 33. The trace bar 33 is made, for example, of a thermosetting plastic material, and although it need not be extremely strong, it should for best operation be sufficiently firm that it may be shifted generally longitudinally and downwardly, against the force of a biasing spring, by the application of force at some point along its length, as described below.

The trace bar 33 is provided with a plurality of slots 37 which slant upwardly toward the left as viewed in FIG. 1. Mounted on the support member 31 are a series of machine screws 39 extending through respective slots 37 which bear against the upper edges of the slots and thereby support the trace bar 33. The screws 39 have a smooth shank portion 41 and a flange-like head 43 as shown in FIG. 2. If the bar 33 is shifted to the right as viewed in FIG. 1, the upper edges of the slots 37, and the screws 39, will serve to provide a cam-and-follower action which will lower the trace bar as it is shifted.

The slider 35 is provided with a plurality of slots 30 which slant downwardly toward the left. A series of eyelets 32 are provided extending through respective slots 30 which eyelets serve to fasten the slider 35 in a slidable relationship to the trace bar 33. If the slider 35 is shifted to the right with respect to the trace bar 33, the lower edges of the slots 30, and the eyelets 32, will serve to provide a second cam-and-follower action, which will raise the slider as it is shifted.

For urging or biasing the trace bar 33 upwardly and to the left, and at the same time for urging or biasing the slider 35 downwardly and to the left with reference to the trace bar 33, there is provided a tension spring 34 having one end affixed to the slider 35 and the other end affixed to the support member 31. It will be noted that, in order for the spring 34 to bias both the slider and the trace bar simultaneously, the line of action of the spring 34 should lie within the acute angle between respective perpendiculars to the directions of the slots 30 and 37. Friction between the trace bar and the slider tends to make the two members move together as a unit in response to the force of the spring 34.

Figures 6, 7, 8, 9, 10:
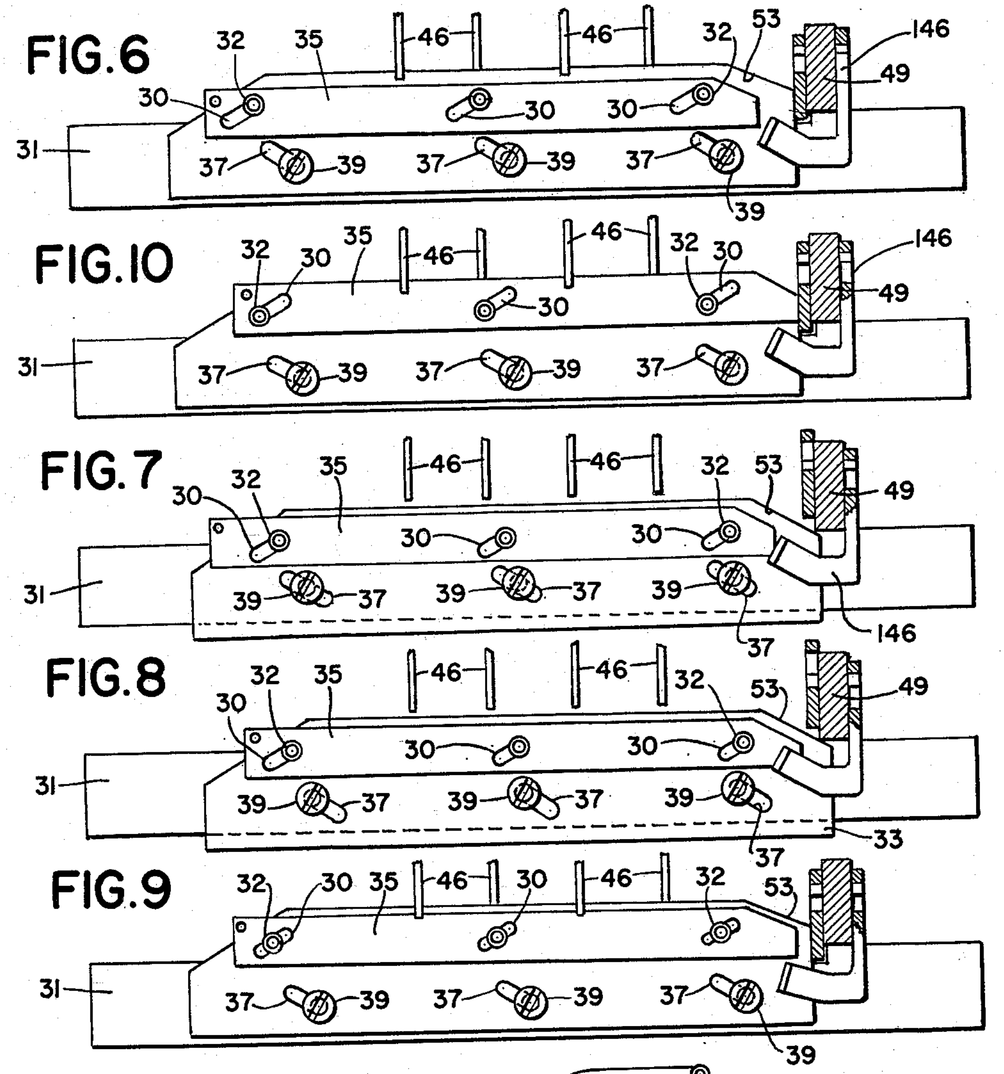
FIG. 6 is an elevational view of a trace bar in operative relationship with a locking device, a holding contactor and a plurality of forked spring contactors, showing the trace bar in its raised position, showing a conductive slider in its lower position on the trace bar, and showing the holding contactor and the spring contactors out of contact with the slider.
FIG. 7 is similar to FIG. 6 except that it shows the trace bar unlocked and partially lowered, with the holding contactor and slider in contact.
FIG. 8 is similar to FIG. 7 except that it shows the trace bar fully lowered.
FIG. 9 is similar to FIG. 6 except that it shows the slider partially raised and in contact with certain of the spring contactors.
FIG. 10 is similar to FIG. 9 except that it shows the slider fully raised and in contact with the locking device as well as with the spring contactors.
Figures 4, 5:
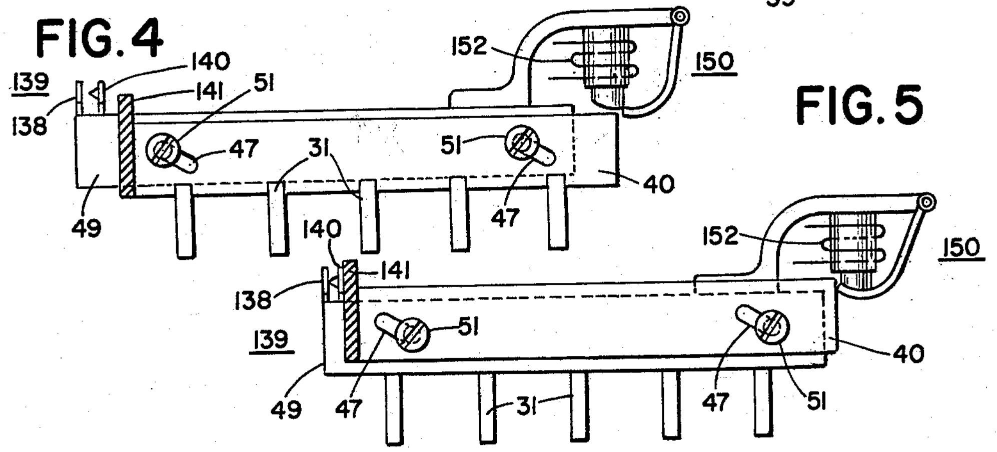
FIG. 4 is an elevational view of a locking device for trace bars, showing the locking device in the position in which the trace bars are locked.
FIG. 5 is an elevational view of the arrangement shown in FIG. 4, showing the locking device in the position in which the trace bars are unlocked.

The support member 31 is provided with a notch 45 into which is lowered a bumper or lock member 40 which does not touch support member 31 and which is arranged to have limited vertical and horizontal motion with respect to the support member 31. For the purpose of providing the desired motion of the lock member 40, a plurality of slots 47 are provided in the lock member 40 which slant downwardly to the right as viewed from the lefthand end of the system as shown in FIG. 1 and as viewed in FIG. 4. A support member 49, preferably of insulating material, is provided which is in turn supported by the trace bar support member 31 and by a plurality of additional trace bar support members similarly designated by reference numeral 31. The lock member 40 is slidably fastened to the support member 49 by means of a plurality of screws 51 similar to the screws 39 which extend through respective slots 47. It will be seen that when the lock member 40 is shifted to the left as viewed in FIG. 4, a third cam-and-follower action is provided which raises the lock member 40 as it is shifted to the left into a position as shown in FIG. 5, thereby withdrawing the lock member 40 from the notches 45. It will also be seen that when the lock member 40 is lowered in the notches, movement of all the trace bars 33 toward the right as viewed in FIGS. 1 and 6 is blocked by the lock member 40. On the other hand, when the lock member 40 is in the raised position, movement of the trace bars to the right is permitted. To facilitate the movement of a trace bar downwardly and to the right when the lock member is raised, the leading edge 53 of the trace bar 33 is trimmed to have a downward slant toward the right, thereby clearing the lock member.

The slider 35 is provided with a tongue 55 (FIG. 1) which comprises a metallic strip similar to that of which the slider is made, fastened preferably at right angles to and depending from the slider 35 and having its lower end twisted at right angles about a vertical axis to form a bearing surface 56 upon which a force may be exerted to shift the slider toward the right against the force of the spring 34. The friction between the slot 30 and the eyelet 32 causes the members 33 and 35 to move in the downward direction when the lock member 40 is unlocked and pressure is applied to the bearing surface 56 of tongue 55. The trace bar is shown in partially lowered position in FIG. 7 and in fully lowered position in FIG. 8. On the other hand, when the lock member 40 is in the notch 45 and the force is applied to the tongue as above, the trace bar is blocked and the slider is moved upwardly toward the right. The slider 35 is made of sufficient length and is so mounted as to strike against and make electrical contact with the lock member 40 at the extreme end of the stroke. The slider is shown in partially raised position in FIG. 9 and in fully raised position in FIG. 10.

The lock member 40 is provided with a lock magnet 150 which, to shift the lock member upwardly and toward the left as viewed in FIG. 4. In order to urge or bias the lock member downwardly toward the right as viewed in FIG. 4, the lock member 40 is preferably a metal bar of sufficient weight to restore the member normally to the lowered position.

For providing electrical connections from a current source to control a given organ stop, there is provided a plurality of forked spring contactors 46. The shank portion 50 of the contactor 46 (FIG. 3) is inserted through slits 52 and 75 in a crossbar 48 which is mounted above and in transverse relationship to a plurality of trace bars 33. Each trace bar support member 31 is provided with an insulating strip member 54 (FIG. 3) mounted on the side of the member 31 opposite from the trace bar 33. One tine 57 of the contactor 46 is set into a hole or socket 59 which is provided in the insulating member 54. The second tine 61 of the contactor 46 terminates in the vicinity of the upper edge of the trace bar 33. All the contactors 46 in a group supported by a single crossbar 48 are electrically connected together. This is preferably accomplished by making the crossbar 48 of electrically conductive material.

The contactors 46 are made of resilient material, preferably nickel silver wire of rectangular cross-section. In an embodiment that has been used successfully, the wire is of square cross-section, 0.017 inch by 0.017 inch, in a 0.020 inch slot. The contactor may be formed as by bending a length of wire double to form the shank portion and spreading the ends apart somewhat to form the tines. The tines preferably are provided with flattened portions 84, 86 to facilitate flexure. The contactor 46 and the spacing between the insulating member 54 and the crossbar 48 should be mutually so proportioned as to permit the contactor to be put into place while flexing the tine 57 of the contactor.

The crossbar 48 is slidably mounted in suitable supports for limited longitudinal motion. In the normal position of the crossbar 48 when the trace bar 33 is down, the contactors 46 are free from strain, the tines 57 and 61 being substantially parallel and vertical. A magnet 90 is provided for moving the crossbar 48 to a shifted position in which the contactors 46 tend to have their tines spread apart, the shift being in the direction to swing the tine 61 upward while bending the tine 57, principally at the flattened portion 84. In the shifted position, the tine 57 remains nearly vertical while the tine 61 and shank 50 are deflected, the tine 61 standing apart from the tine 57 at greater than the normal spacing. It will be seen that when the crossbar is moved, the spatial relationship of the tine 61 to the trace bar 33 may be changed. By an appropriate sequence of motions of the trace bar and the crossbar, the tine 61 of a contactor 46 may be set either upon the side of the trace bar where the conductive slider 35 is mounted (the "on" side) or upon the side of the trace bar immediately adjacent to the support member 31 (the "off" side). When the contactor has its tine 61 set on the "on" side, upon operation of the slider 35 electrical contact may be made between the tine 61 and the slider 35 to effect operation of an organ stop associated with the crossbar. When the contactor has its tine 61 set on the "off" side, electrical contact between the tine 61 and the slider does not occur. Thus, with respect to a given trace bar 33 an organ stop associated with a given crossbar 48 may be "set on" or "set off" according to whether the tine 61 is on the "on" side or the "off" side of the trace bar. For urging or biasing the crossbar 48 to the normal position a compression spring 64 (FIG. 21) is provided, preferably within the hollow portion of the crossbar 48, with one end affixed to one end of the crossbar 48 as at a soldered connection 68 and the other end pressed against a conductive pin 66 mounted upon an insulating portion of the frame of the system. An electrical connection is made to the pin 66 and a circuit is extended through the spring to the crossbar and thence to all the contactors 46 associated with that crossbar. The crossbar 48 is provided with a slot 81 by means of which the pin 66 guides the motion of the crossbar. As an extra precaution a pigtail connection 320 may be made between the pin 66 and the crossbar 48 as at the point 68 to eliminate any loose connection between the spring 64 and the pin 66.

All (or any one or more) of the contactors 46 of a given group, carried by a single crossbar, serve to control a given stop of the organ.

FIG. 1 shows a console stop action unit 106 which includes a manually operable stop tablet 193. This tablet and the associated unit 106 is one of a plurality of similar assemblies that are provided. The details and electrical connections of this assembly are shown in FIG. 1 and the other similar assemblies are omitted from the drawing for the sake of clarity because the details and connections of the other assemblies will be clear from what is shown for the one assembly, which is typical of the others.

CONSOLE STOP ACTION UNIT

The console stop action unit 106 includes a frame 108 and a movable member 110, having an "off" position and an "on" position. As shown, this member is pivotally mounted in the frame 108 for rocking about an axis indicated at 109. The movable member 110 has projecting portions 112 and 114. The member 110 and the portions 112 and 114 are of ferromagnetic material, and serve as an armature. Mounted on the frame there is an "on" coil 116 and an "off" coil 118, associated respectively with these projections. When the coil 116 is energized, it urges the movable member 110 to rock toward the "on" position. When the coil 118 is energized, it urges the member 110 to rock toward the "off" position.

The coils 116 and 118 are provided with pole pieces 116*a* and 118*a* respectively. These pole pieces and the projecting portions 112 and 114 of the armature are shaped, as shown, so that either of these projecting portions may be brought to overlie the respective pole piece by movement of the member 110.

Extending through a slit in the frame is a strip-like movable member 120. The movable member 110 is provided with a notch midway of its outer edge, and one end of the member 120 fits into this notch. Rocking of the member 110 between "on" and "off" positions produces a corresponding motion of the member 120, which rocks, and slides slightly, in the slit in the frame. A position half-way between "on" and "off" positions, for the members 110 nad 120, is referred to hereinafter as a central position.

Surrounding the member 120 is a spring 122, in compression. One end of the spring presses against the frame 108, and the other end of the spring presses against the shoulder 61 of the member 120, so as to urge this member into the notch of the member 110. The spring also has the effect of urging the members 110 and 120 away from their central positions and toward their "on" or "off" positions. Consequently the device is mechanically stable in its "on" and "off" positions but unstable in its central position. Once the device is shifted to the "on" position or the "off" position, the spring tends to hold it there, i.e., the device is bistable.

If, while the "on" coil 116 is energized and after the member 110 has rocked into the "on" position, the "off" coil 118 is subsequently energized, the member 110 will remain in the "on" position. That is, once this member has been rocked into the "on" position, the "on" coil is capable of holding the member in that position, despite the existence of current in the "off" coil. One reason for this is that the geometry of the construction of the device is such that when the member 110 is in the "on" position, its projecting portion 112 is in the magnetic field of the "on" coil 116 to a greater extent than is the projecting portion 114 in the field of the "off" coil 118. The coil 116 under this circumstance has the greater influence on the member 110. Similarly, once the member 110 has been rocked into the "off" position, the "off" coil is capable of holding the member in that position, despite the existence of current in the "on" coil.

There is provided for various uses in the system of FIG. 1 a source of electric current (not shown) the positive terminal of which is connected to various points in the system at the places indicated by the reference numeral 124. The negative terminal 126 of this source is connected to various other points in the system at the places indicated by the reference numeral 126. Two or more separate current sources may of course be provided in place of a single source, if desired.

A circuit is provided from a terminal 124 through a lead 130 to the "on" coil 116 and thence over a lead 158, which passes through the frame 108 in an insulated bushing 159, to the terminal 66, and thence via the conductive crosbar 48 (designated "I" in FIG. 1 to distinguish from the other crossbars) to the plurality of forked spring contactors 46 associated with the crossbar "I." When any one of the contactors 46 carried by the crossbar "I" makes contact with the slider 35 of an associated trace bar 33, a circuit is completed through the slider 35 to a terminal 126, one of which terminals is connected to each of the sliders.

The positive terminal 124 is also connected by the lead 130 to the frame 108 as to 63. Through the frame 108 there is an electrical connection to the movable member 120. This connection may be partly at the point where the member 120 passes through the slit in frame 108, and may also include the connection at the pivotal point 109 through the movable member 110. In addition, if needed, the frame may be connected by a pigtail connection to the member 120. When the movable member 110 is in the "on" position, and consequently the right-hand end of the member 120 is down, this member engages a contact 105 (the member 120 and contact 105 constituting a switch referred to as the console switch) and an energizing circuit is extended through a lead 104 and a lead 103 to a winding 93 of a magnet 90 which controls the shifting of the crossbar 48 and is referred to as a crossbar magnet. Completion of this energizing circuit requires the meeting of a movable contact 97 and a stationary contact 98 associated with a relay 94, referred to as the "return tie relay," by means of which the circuit may be extended to a negative terminal 126. The lead 104 also connects with a lead 190 which extends an energizing circuit to a winding 188 of an organ stop action control magnet 186 and thence directly to a negative terminal 126.

For energizing the "off" coil 118 a circuit extends from a positive terminal 124 via lead 130, frame 108, a movable contactor 67 conductively connected to the frame, a relatively fixed contactor 69, a lead 71 through an insulated bushing 178 in frame 108, through "off" coil 118 and thence via a lead 172 passing through a bushing 174 in the frame 108 to a fixed contact 168 associated with a relay 160. When the relay 160 is operated, and provided contacts 67 and 69 are engaged, the circuit is extended via a movable contact 166 of the relay 160 to a negative terminal 126. The relay 160, being instrumental in controlling the "off" coil, is referred to as the "off" relay.

The switch 65 formed by the contacts 67 and 69 is operated by means of an auxiliary armature or magnetic plunger 73 attached to the movable contact 67 in the neighborhood of the pole piece 116*a*. The armature 73 is relatively lighter than the main armature 110. When the armature 110 is in the "off" position, it is sufficiently withdrawn from the pole piece 116*a* so that if the "on" coil is energized the auxiliary armature 73 is attracted toward the pole piece 116*a*, thereby opening the switch 65. The switch remains open until the relatively slowly moving armature 110 has substantially reached its "on" position. Then the magnetic flux of the coil 116 is nearly all diverted from the armature 73 to the armature 110, at which time the switch 65 closes.

An operating circuit is provided for the "off" relay 160 from a positive terminal 124 through the winding 162 of the relay 160 and thence via a lead 184 to a conductive connection with the lock member 40. When the slider 35 of any trace bar 33 makes contact with the lock member 40, this circuit is extended through the slider to a negative terminal 126.

An energizing circuit is provided for the return tie relay 94 from a positive terminal 124 through the winding 95 of the relay 94 and thence via a lead 136 to a fixed contact 138 of a switch 139, referred to as the crossbar interlock switch, that is carried by the support member 49. With the fixed contact 138 in the switch 139, is associated a movable contact 140 also carried by the support member 49. The member 40 engages the contact 140 and closes the switch 139 when member 40 is moved to the left as shown in FIGS. 4 and 5. The energizing circuit for relay 94 is then extended through a lead 144 to a plurality of holding contactors 146 mounted on the support member 49 and positioned adjacent to the respective sliders 35 near the right-hand end of each slider. When any slider comes in contact with its associated holding contactor 146, while contacts 138 and 140 are engaged, the circuit is further extended through the slider to a negative terminal 126.

One of the manual pistons is shown at 83 in FIG. 1. This piston when depressed closes an energizing circuit through the winding 72 of a magnet 70 for exerting a force upon the bearing surface 56 of the tongue 55, thereby moving either the slider alone or the trace bar and slider together as a unit as above described.

The setter button is shown at 148. This button serves the entire system, and when depressed closes an energizing circuit through the winding 152 of the lock magnet 150, thereby raising the lock member 40.

A holding circuit is provided for the purpose of making it possible to release the setter button and still have the switch 139 remain closed and the lock member 40 remain in its raised position. This holding circuit is extended from a negative terminal 126 to a movable contact 194 of the relay 94. When the relay 94 is energized, the movable contact 194 engages a fixed contact 192 of this relay, thereby providing a circuit from terminal 126 via a lead 199 to the winding 152, which circuit is in parallel with the circuit which includes the setter button 148.

OPERATION OF CAPTURING A GROUP OF STOPS

It will be seen that in the system herein described each stop of the organ is under the manual control of the organist at all times by means of the associated console stop action unit. By manually depressing the tablet 193 the organist effects the engagement of the movable member 120 with the fixed contact 105, thereby completing the energizing circuit for the associated organ action control magnet 186 and operating the associated stop of the organ. By manually raising the tablet 193 the organist effects the breaking of the contact between the elements 120 and 105, thereby de-energizing the magnet 186 and cancelling the associated stop. The combination action makes no changes in the stops except at the time a piston is depressed.

Thus, the organist may employ any desired combination of stops and may change from one combination of stops to another at any time by raising and lowering the associated tablets as desired, independently of the combination action.

The operation of capturing a desired combination of stops for simultaneous control by means of a manual piston will now be described with special reference to a maximum of four stops, which may be referred to as stops I, II, III, and IV corresponding to crossbars "I," "II," "III," and "IV" respectively in FIG. 1. This will illustrate the four possible situations that arise. The piston may have previously been set up to control, for example, the combination shown in Table 1.

*Table 1*

| Stop: | Condition |
|---|---|
| I | Off |
| II | Off |
| III | On |
| IV | On |

The organist may now desire to use the piston to control, for example, the combination shown in Table 2 instead.

*Table 2*

| Stop: | Condition |
|---|---|
| I | Off |
| II | On |
| III | Off |
| IV | On |

It will be seen that the situations involved in making this change are as given by Table 3.

*Table 3*

| Case: | | Situation |
|---|---|---|
| (1) | Stop I | Initially off, is to be left off. |
| (2) | Stop II | Initially off, is to be set on. |
| (3) | Stop III | Initially on, is to be set off. |
| (4) | Stop IV | Initially on, is to be left on. |

Evidently these four cases cover all the situations that can arise, as far as involves only the piston for which the change of combination is to be effected, and no loss of generality results from using the particular combinations given in Tables 1 and 2 as illustrative examples.

Since the action of any crossbar 48 through its associated contactors 46 affects all the trace bars 33, it is necessary to consider not only the trace bar associated with the piston which is to be set up, but also the trace bars associated with the other pistons. Although they are not immediately involved, these other trace bars may have previously been set up to control selected combinations of stops, which combinations it is desired to preserve for future use. If a given stop has been captured by a piston, it is desired that that stop shall remain captured by that piston after a change of combination has been carried out involving some other piston. Likewise, if a given stop is not coupled up to a certain piston, it is desired that that stop shall not be captured in the process of changing the combination controlled by another piston. In order to cover these two cases, which are all the cases that can arise involving more than one piston, special reference will be made to the case of a maximum of three pistons, upon one of which all four stops are set "off," upon a second of which all four stops are set "on," and upon the third of which the above described change in the combination of stops from that of Table 1 to that of Table 2 is to be effected. For reference, the trace bars associated with the respective pistons are designated "A," "B," and "C," and the crossbars associated with the four representative stops are designated "I," "II," "III," and "IV," respectively, in FIG. 1.

In general, to capture a stop and thereby couple the captured stop to the piston, the console tablet 193 associated with the desired stop is manually placed in the "on" or down position if the tablet is not already in that position. This operation engages the members 120 and 105, an operation which is referred to as closing the console switch, and leaves the console stop action unit in the mechanically stable "on" condition. Closing the console switch completes the energizing circuit for the associated organ stop action control magnet 186 as above described, immediately activating the selected organ stop. Closing the console switch also conditions the energizing circuit for the crossbar magnet 90 so that this magnet may now be activated by the return tie relay 94. In performing this step on the setting side, the organist may select any desired combination of stops, by depressing the tablets associated with the stops he desires to capture and raising the tablets associated with the stops that he does not desire to capture.

It is also necessary, before the process of capturing a desired combination of stops for the piston can be completed, to press the setter button manually and hold it depressed. This completes the energizing circuit for the lock magnet 150, causing the lock member 40 to be lifted out of the notches 45 in the respective support members 31 where it appears in FIG. 4 and to be shifted upward and to the left causing an insulating extension or portion 141 attached to or integral with the lock member 40 to press against the movable contact 140 as shown in FIG. 5. The movable contact 140 is caused to engage the fixed contact 138, thereby closing the crossbar interlock switch 139. The raising of the lock member 40 causes all the trace bars 33 to be unlocked. The closing of the crossbar interlock switch 139 conditions the energizing circuit of the return tie relay 94 so that operation of this relay is now under the control of any slider 35 and its associated holding contactor 146.

The next step in the capturing process is to press a selected manual piston and hold it depressed. This completes the energizing circuit for the associated piston magnet 70 causing the associated trace bar 33 and slider 35 to begin to move as a unit downwardly and to the right as described above. Almost immediately, as shown by FIG. 7, the slider 35 makes contact with the holding contactor 146, thereby completing the energizing circuit for the return tie relay 94. Operation of this relay engages contacts 97 and 98, thereby completing the energizing circuit for the cross-bar magnet 90 and moving the associated crossbar 48 to its shifted position, thereby flexing all the forked spring contactors 46 mounted on the shifted crossbar. By the time the magnet 90 can act, however, the trace bar will already have been sufficiently lowered so that it is free of engagement with the associated contactors 46. Operation of the relay 94 also engages the contacts 192 and 194, thereby completing the holding circuit for the winding 152 of the lock magnet 150 which circuit is in parallel with the circuit through the setter button 148. The setter button may now be released and as long as the piston 83 is held depressed, the effect upon the system is the same as if the setter button were also being held depressed. The organist, however, upon releasing the setter button, now has one hand free.

In the case of a stop that is not one selected for capture, the energizing circuit for the crossbar magnet associated with this stop is broken at the console switch, so that when the trace bar is lowered and the return tie relay 94 is actuated as above described, the crossbar magnet is not energized and consequently the crossbar associated with this stop is not shifted.

Regardless of whether a particular stop is one selected for capture, when the piston 83 is depressed, the piston magnet 70 moves the trace bar 33 and the slider 35 as a unit and the movement continues until the trace bar is in its lowermost position as limited by the upper end of the slot 37 and shown in FIG. 8. In the thus lowered position of the trace bar 33, all the forked spring contactors 46 associated with the trace bar are free from engagement with the trace bar and assume their desired positions relative to the trace bar according to whether or not the associated organ stop is to be set "on" or "off." At this stage the organist if he so desires may use his free hand to play a few notes to determine the musical effect produced by the combination of stops that he has selected, and if not satisfied, he can add and subtract stops as he desires. For this purpose he can use his free hand to manipulate the stop tablets, raising the tablet associated with any stop which he decides to eliminate and depressing the tablet associated with any stop which he decides to add into the combination as tentatively set up.

When the organist is satisfied with the combination of stops which he has selected, he may complete the capturing operation by the final step of merely releasing the manual piston 83. This de-energizes the piston magnet 70, allowing the spring 34 to raise the trace bar 33 and slider 35 as a unit to the normal, raised position. During the raising of the trace bar, the trace bar retains its proper relative position with respect to the contactors 46 according to whether the individual contactor is conditioned to be set "on" or set "off." After this relative position has been fully established, and just prior to the completion of the upward stroke of the trace bar, the holding contactor 146 is parted from contact with the slider 35 thereby de-energizing the return tie relay 94 which in turn de-energizes the crossbar magnet 90, returning each crossbar to its normal position if it was shifted, thereby completing the setting of the contactors "on" or "off" according to the selected combination of stops to be set up on the piston. The deactivation of the relay 94 also de-energizes the lock magnet 150, restoring the lock member 40 to the locked position. It should be emphasized that the crossbars that are shifted by their respective relays 90 remain in the shifted position until the trace bar has almost completed its upward, or return, motion. Then, when the contact between the slider 35 and the holding contactor 146 is broken, the crossbars return to normal position, assuring a positive setting. This part of the setting process is fully automatic and so does not depend upon coordinated manipulation of the manual piston and the setter button on the part of the organist.

Reverting to the intermediate stage of the capturing operation wherein the trace bars are unlocked, the manual piston is depressed, and changes may be made at will in the combination of stops that are to be captured, it will first be explained how a particular stop which has been set "on" may be unset. The organist, while holding the piston depressed with one hand, manually raises the associated stop tablet with the other hand. This opens the console switch, de-energizing the associated organ stop action control magnet 186 and de-activating the organ stop. Opening the console switch also breaks the energizing circuit for the associated crossbar magnet 90, thereby returning the associated cross-bar 48 and contactor 46 to the normal condition necessary to unsetting the contactor. The operation leaves the console stop action unit mechanically stable in the "off" position. When the manual piston is then released, the stop is set "off."

To add a stop while holding the piston depressed, it is only necessary to depress the associated stop tablet thereby energizing the associated crossbar magnet 90, causing the associated crossbar 48 to move to the shifted position, and thereby flexing the associated contactor 46 as required in setting this contactor "on." When the manual piston is then released, the stop is set "on."

THE OPERATING SIDE

After a combination of stops has been set up on a selected piston, the organist may bring this combination of stops into action on the operating side at any time by merely momentarily depressing the piston, the setter button remaining untouched. It will be seen that since the setter button has not been depressed, the lock member 40 is now resting in the notches 45 of the support members 31 as shown in FIG. 6. Pressing the piston activates the piston relay 70 and since the trace bar is locked, this relay causes the slider 35 to rise, first making contact with all contactors 46 which are set "on," as shown in FIG. 9. In the case of each "set on" contactor, this completes the energizing circuit for the associated "on" coil 116. The "on" coil acts electromagnetically to shift the console stop action unit 106 to the "on" position if it is not already in that position, thereby activating the associated organ stop action control magnet 186, bringing in the desired stop. Since the system is locked, the further motion of the slider 35 brings the slider into contact with the lock member 40, as shown in FIG. 10, thereby completing the energizing circuit for the "off" relay 160, provided the switch 65 is closed. When the "off" relay is energized, the energizing circuit for the "off" coil 118 is conditioned through the contacts of the "off" relay. The effect of opening the switch 65 will be discussed presently.

Assuming that the switch 65 does not open, the "off" coil 118 is immediately energized following the actuation of the "off" relay. The console switch remains on, however, because the "off" coil cannot move the armature 110 away from the "on" position while the "on" coil is energized. When the manual piston is released, the slider 35 first breaks contact with the lock member 40, thereby de-energizing the "off" relay 160 which in turn de-energizes the "off" coil 118, the console switch remaining on. Next, the slider 35 breaks contact with all "set on" contactors 46, thereby breaking the energizing circuits of the associated "on" coils 116, the console switch again remaining on.

With reference to any stop that is "set off," the situation is different. The slider does not contact the contactor 46 for this stop. Accordingly, the associated "on" coil 116 is not energized and the console switch is not moved. When the slider makes contact with the lock member 40, however, the "off" coil for this stop is energized, thereby electromagnetically shifting the console switch to the "off" position if it is not already in that position. When the manual piston is released, the "off" coil is deenergized, the console switch remaining off.

It is important to notice that, on the operating side, the "on" coils of the stops that are "set on" are always energized before the "off" coils are energized, and the "off" coils are always de-energized before the "on" coils are de-energized. This sequence of action is fully automatic because, as the manual piston is depressed the slider 35 first contacts the "set on" contactors 46 and later, at the end of the stroke, the slider contacts the lock member 40. When the manual piston is released, the slider first breaks contact with the lock member 40 and later breaks contact with the contactors 46.

Thus the stop tablets of all the stops called for in the combination set up on the selected piston are automatically shifted to the "on" position and the corresponding organ stops are activated, while the stop tablets of all the stops not included in the combination are automatically shifted to the "off" position and the corresponding organ stops are de-activated, all as if the organist had manually shifted the stop tablets.

The switch 65 operates at certain times to break the energizing circuit of the "off" coil 118, but does so only in the case in which the associated stop is "set on" and the console switch is initially in the "off" position. It will be noted that the switch 65 plays no part whatever on the setting side, since neither the "on" coil nor the "off" coil is energized on the setting side.

On the operating side, when the stop is "set on" and the console switch is off, it is necessary that the "on" coil act to shift the console switch to the "on" position without interference from the "off" coil. If the "off" coil is energized too soon after the "on" coil is energized, the armature 110 may start away from the pole piece 118*a* and then be pulled back to the "off" position by the "off" coil before the "on" coil can get it shifted safely to the "on" poistion. To prevent this result, the energization of the "on" coil 116 is utilized to attract the magnetic plunger 73 which moves the contact 67 away from the contact 69, thereby opening the switch 65 and deconditioning the energizing circuit of the "off" coil 118. The switch 65 remains open until the main armature 110 is substantially in the "on" position, in which position most of the magnetic flux of the "on" coil 116 goes to the armature 110, leaving substantially no flux to attract the plunger 73. Switch 65 then closes. By this time the "off" relay 160 which has been energized, is able to energize the "off" coil 118. The action from this point on is the same as in the case above described in which it is assumed that the switch 65 did not open.

In the case when the stop is "set on" and the console switch is "on" initially, the armature 110 takes the flux away from the plunger 73 so that the switch 65 does not open. There is no need for the switch 65 in this case because the "off" coil cannot pull the armature 110 away from the "on" position while the "on" coil is energized.

In the cases when the stop is "set off," the "on" coil is not energized and consequently the switch 65 will not open. There is no need for the switch 65 in these cases because the "on" coil is not energized and therefore it cannot interfere with the movement of the armature 110 by the "off" coil.

Having brought in stops controlled by a first manual piston, if the organist thereafter wishes to bring in instead the stops controlled by a second piston, he momentarily depresses the second piston, whereupon the desired effect is automatically produced. The trace bar controlled by the second piston, in addition to energizing the desired "on" coils like 116, also, when it strikes the lock member, energizes the "off" relay 160. That relay in turn, through contacts 168, 169, energizes the "off" coils for all the console stop action units. If the "on" coil for the unit is not energized, the unit will be turned off.

Figure 11:
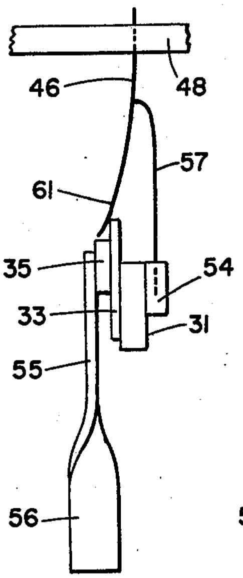
FIG. 11 is an enlarged fragmentary view, partly in cross-section, useful in explaning the interactions between a sliding contactor mounted upon a trace bar and one of the forked spring contactors, showing the spring contactor "set on" and the slider in the lower position.
Figure 12:
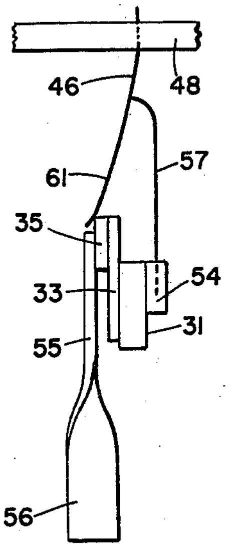
FIG. 12 is similar to FIG. 11 except that the slider is shown in its raised position.

FIGS. 11 and 12 show the relative positions of the slider 35 and a "set on" contactor 46 on the operating side before and after the associated piston is pressed to operate a group of stops in a predetermined combination. In FIG. 11, the contactor 46 is shown "set on" with its tine 61 pressed against the upper edge of the non-conducting trace bar 33 immediately above but spaced apart from the slider 35. The tongue 55 is in its normal (lower) position. In this position, the trace bar 33 is in its uppermost position relative to the support member 31 and the slider 35 is in its lowermost position relative to the trace bar. When the manual piston is pressed while the lock member is down, the slider is caused to rise to the position shown in FIG. 12 where the slider is thrust upward against the lower side of the tine 61 in opposition to the resilience of the tine, thereby making a positive electrical connection between the tine and the slider, to energize the associated "on" coil thereby to actuate the associated organ stop.

Figure 13:
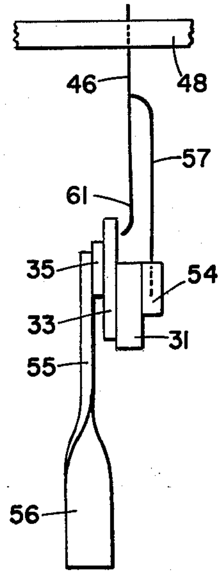
FIG. 13 is similar to FIG. 11 except that the spring contactor is shown "set off"
Figure 14:
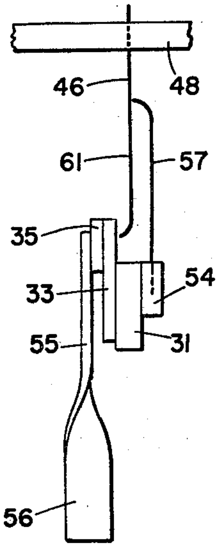
FIG. 14 is similar to FIG. 12 except that the spring contactor is shown "set off"

FIGS. 13 and 14 show the relative positions of the slider 35 and a "set off" contactor 46 on the operating side before and after the piston is depressed. In FIG. 13, the contactor 46 is shown "set off," that is, with the tine 61 unflexed and occupying a position on the side of the trace bar 33 away from the slider 35. FIG. 14 shows how, when the slider 35 is raised there is now no possibility of an electrical contact occurring between the slider and the contactor 46. Consequently, the associated organ stop will not be activated.

ANALYSIS OF THE CAPTURING PROCESS

Turning now to a more analytical view which is believed to promote a clearer understanding of the capturing process it will be noted that this process may be regarded as comprising only four fundamental steps, namely, (1) lowering a trace bar, which for brevity is designated "lower"; (2) shifting a crossbar, or, briefly, making a "shift"; (3) raising the trace bar, which is designated "raise"; and (4) returning the crossbar to normal, or, briefly, "return." When all four of these steps are needed, they are always taken in the order just given. In cases where a shift is not required, the crossbar remains in the normal or unshifted state while steps (1) and (3) are taken and no return step is needed. The capturing process is carried out only while the trace bars are unlocked and only one trace bar is out of its normal, raised position at any time.

To lower the trace bar when it is unlocked, the organist merely depresses the associated manual piston and holds it depressed. The actual lowering of the trace bar is accomplished by the resultant energization of the piston magnet 70.

To perform a shift it is necessary to energize the crossbar magnet 90. To do this requires the coincidence of closure of the console switch and energization of the return tie relay 94. The console switch is closed manually by the organist by depressing the stop tablet 193 either before or after depressing the manual piston. The relay 94 requires for its energization the closure of the crossbar interlock switch 139 together with the engagement of a holding contactor 146 with the slider 35 on a trace bar. These latter conditions are fulfilled when the lock member 40 is up and the piston is being manually held depressed by the organist.

To prevent a shift, the organist raises the stop tablet 193, thereby opening the console switch and thus deconditioning the energizing circuit for the associated crossbar magnet 90.

To raise the trace bar, the organist need only release the piston, thereby de-energizing the piston magnet 70 and permitting the spring 34 to restore the trace bar to the normal or raised condition.

If the crossbar has been shifted, it is returned to normal when the trace bar has returned nearly to normal, at which time the slider 35 breaks contact with the holding contactor 146, thereby de-energizing return tie relay 94, which in turn breaks the energizing circuit for the crossbar magnet at the contacts 97, 98.

To summarize, the organist in effect determines whether or not there will be a shift of a given crossbar by manually placing the associated stop tablet in the "on" position for a shift or to the "off" position to prevent a shift. He initiates the sequence of steps, namely, lower, shift or not, raise, return or remain unshifted; by pressing first the setter button, then the manual piston, and then releasing first the setter button and then the manual piston. The stop tablets may be positioned either before or after the setter button is pressed or while the manual piston is being held pressed.

Figure 15:
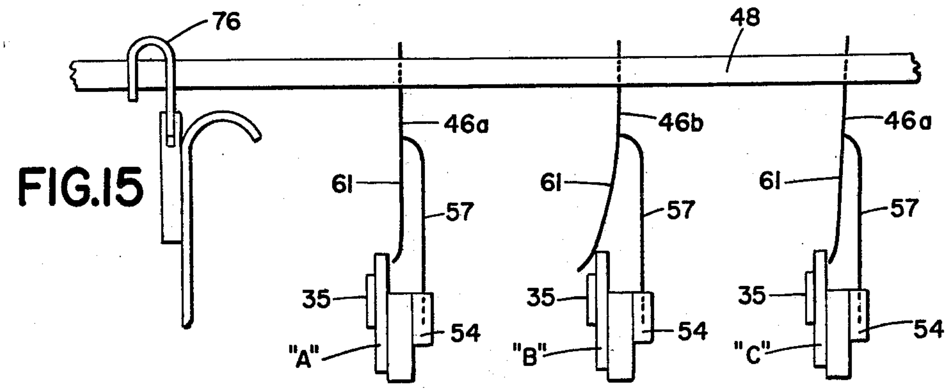
FIG. 15 is a fragmentary view, partly in cross-section, useful in explaning the capturing process, showing a crossbar in normal position; first, second and third trace bars all in raised position carrying respectively a first spring contactor set off, a second spring contactor set on, and a third spring contactor set off.
Figure 16:
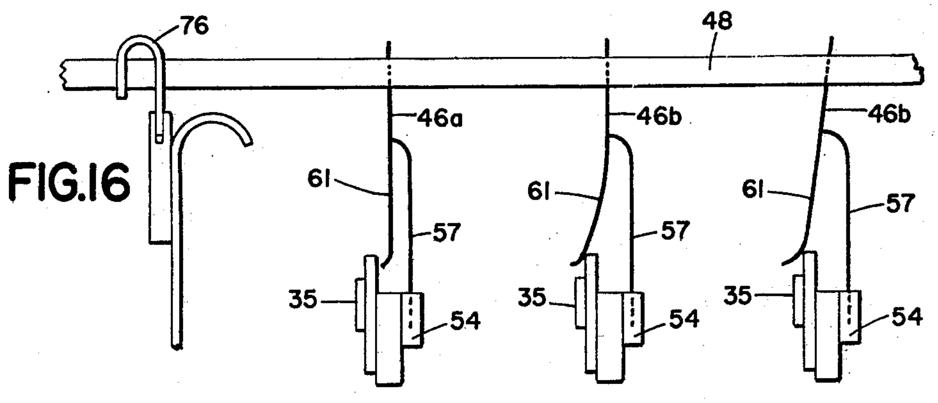
Figure 17:
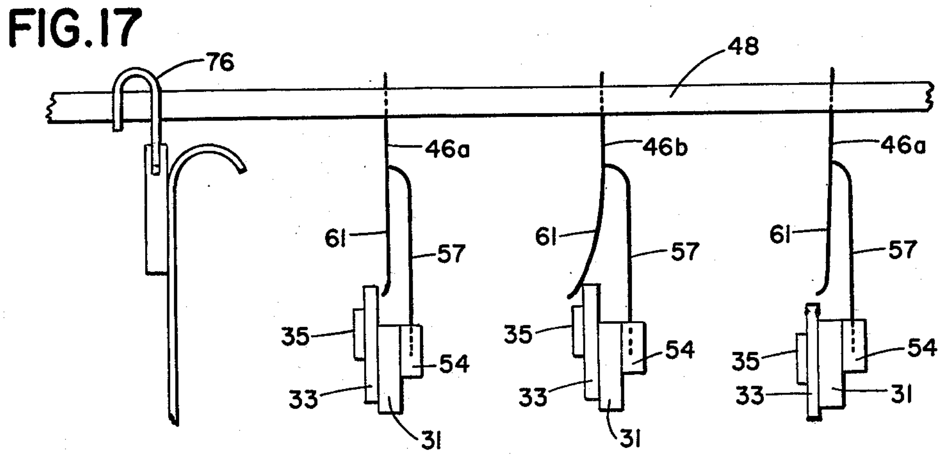
FIG. 17 is similar to FIG. 15 or FIG. 16 except that it shows the position of the third spring contactor after the third trace bar has been lowered.
Figure 18:
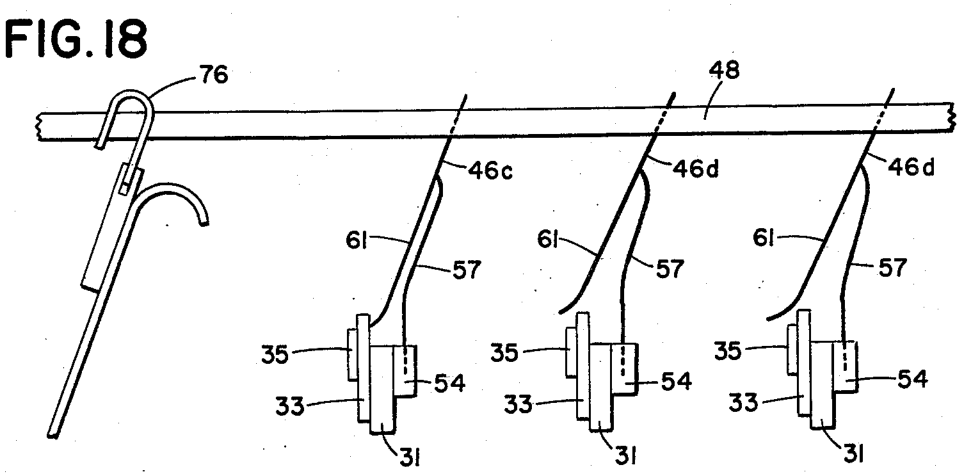
FIG. 18 is similar to FIG. 16 except that it shows the crossbar displaced to the right, thereby flexing the spring contactors.
Figure 19:
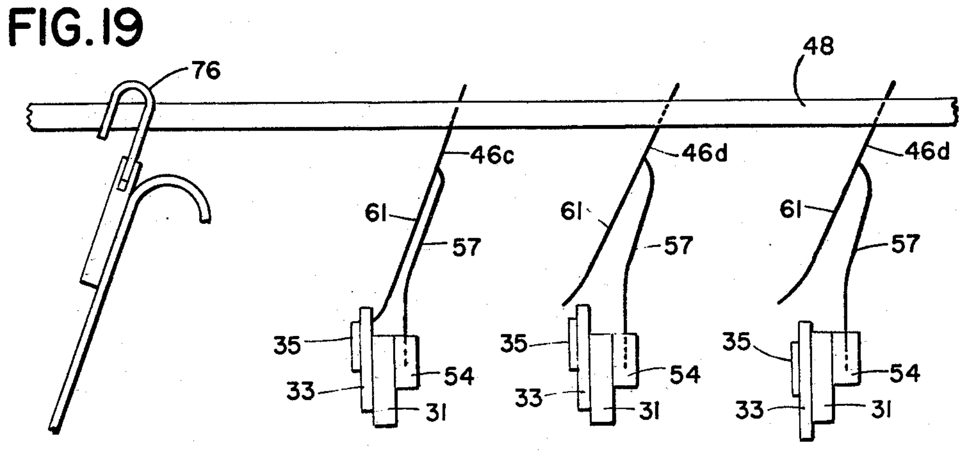
FIG. 19 is similar to FIG. 18 except that it shows the third trace bar in lowered position.

The manner in which the crossbars and the trace bar associated with a selected piston are manipulated to capture the selected organ stops for the piston will now be described in detail with reference to FIGS. 15 through 19. In each of these figures, the illustrative trace bars "A," "B," and "C" are shown diagrammatically in cross-section. In each figure, a crossbar 48 is shown together with three forked spring contactors 46. FIGS. 15, 16 and 17 show the crossbar 48 in normal, that is, unshifted position. FIGS. 18 and 19 show the crossbar 48 shifted to the right. FIGS. 15, 16, and 18 show the trace bar "C" in or close to the raised or normal position and FIGS. 17 and 19 show the trace bar "C" in the partially or fully lowered position. In FIGS. 15 through 19, the trace bars "A" and "B" are shown in the normal position. It will be seen that the five cases illustrated in FIGS. 15 through 19 are sufficient to describe any of the manipulations involved in the capturing process.

It will be seen that there are in all essentially four configurations that the contactor 46 may assume with reference to the trace bar 33. With the crossbar unshifted, the tine 61 of the contactor 46 may be unflexed and clear of the trace bar and positioned on the side of the trace bar 33 away from the slider 35. This configuration is designated by the reference character **46*a*. In this state the contactor will be said to be "free on the 'off' side." Or, with the crossbar unshifted, the tine 61 may be flexed and pressed against the insulation on the side of the trace bar 33 carrying the slider 35. This configuration is designated by the reference character 46*b* and a contactor in this state will be said to be "pressed against the 'on' side." With the crossbar shifted, the tine 61 may be flexed and pressed against the "off" side of the trace bar. This configuration is designated by 46*c* and a contactor in this state will be said to be "pressed against the 'off' side." Or, with the crossbar shifted, the tine 61 may be flexed but clear of the trace bar and positioned on the "on" side of the trace bar. This configuration is designated by 46*d*** and a contactor in this state will be said to be "free on the 'on' side."

The initial state of the system is assumed to be as in the example above described, namely as represented in Table 4.

*Table 4*

| Trace bar | "A" | "B" | "C" | |
|---|---|---|---|---|
| Stop "I" | Off | On | Off | Fig. 15. |
| Stop "II" | Off | On | Off | Fig. 15. |
| Stop "III" | Off | On | On | Fig. 16. |
| Stop "IV" | Off | On | On | Fig. 16. |

The desired final state as in the example above described is represented by Table 5.

*Table 5*

| Trace bar | "A" | "B" | "C" | |
|---|---|---|---|---|
| Stop "I" | Off | On | Off | Fig. 15. |
| Stop "II" | Off | On | On | Fig. 16. |
| Stop "III" | Off | On | Off | Fig. 15. |
| Stop "IV" | Off | On | On | Fig. 16. |

It will be seen that Table 4 is based upon the conditions stated in Table 1 and that Table 5 is based upon the conditions stated in Tables 2 and 3.

It will be seen that four different transitions in all are involved, namely as shown in Table 6.

*Table 6*

| Case | Initial State | Final State | Transition |
|---|---|---|---|
| 1 | Fig. 15 | Fig. 15 | "Off to Off". |
| 2 | Fig. 15 | Fig. 16 | "Off to On". |
| 3 | Fig. 16 | Fig. 15 | "On to Off". |
| 4 | Fig. 16 | Fig. 16 | "On to On". |

To effect the "off to off" transition, the stop tablet associated with stop "I" is initially in the "off" position and is left that way. Accordingly, as the trace bar "C" is lowered during the capture process, the crossbar associated with the stop "I" is not shifted. Since at no time is more than one trace bar lowered, the trace bars "A" and "B" remain unmoved in their raised positions during a capturing operation involving trace bar "C." Consequently, the system involving stop "I" remains for the time being as shown in FIG. 15. When trace bar "C" is lowered, no significant change occurs in the position or configuration of the contactor *46a* associated with this trace bar. The condition of the system is now as represented in FIG. 17. Contactors *46a* associated with trace bar "A" and *46b* associated with trace bar "B" in FIG. 15 do not change and are represented by *46a* and *46b* respectively in FIG. 17. When trace bar "C" is subsequently raised to normal position, the system is again as represented by FIG. 15. Finally, when the piston is released, there is no back shift of the crossbar 48, as this crossbar has remained in normal position throughout the capturing process. Consequently, the final state of the system is as shown in FIG. 15.

To effect the "off to on" transition as for stop "II," the stop tablet associated with stop "II" is manually moved from the "off" position to the "on" position. In this case the crossbar associated with the stop "II" will be shifted, but not until the trace bar has been lowered sufficiently to give the contactor 46 freedom of motion. Consequently, the state of the system first changes from the initial state shown in FIG. 15 to an intermediate state shown in FIG. 17. When the shift occurs, the contactor *46a* associated with trace bar "C" flexes free of trace bar "C" which has been sufficiently lowered and the system becomes as represented in FIG. 19 where the contactor *46d* is free on the "on" side. On trace bar "A," the contactor is pressed on the "off" side and on trace bar "B" the contactor is flexed and free on the "on" side. When the trace bar "C" is being raised, the system takes on the form shown in FIG. 18. Finally, when the crossbar associated with stop "II" has returned to the normal, unshifted position, the system takes on the form shown in FIG. 16, in which stop "II" is now in "set on" position for trace bar "C."

To effect the "on to off" transition, the stop tablet associated with stop "III" is manually moved from the "on" position to the "off" position. The initial condition of the system is that shown in FIG. 16. Because the contactor *46b* associated with trace bar "C" is pressed against the "on" side of the trace bar "C," the tine 61 snap over to the "off" side when the trace bar "C" is lowered. Consequently the system takes on the form shown in FIG. 17. When the trace bar "C" is subsequently raised, the system takes on the form shown in FIG. 15.

To effect the "on to on" transition, the stop tablet associated with stop "IV" is left in the "on" position throughout the capturing process. The initial state of the system is shown in FIG. 16. When the trace bar "C" begins to be lowered a shift of the crossbar occurs with the result that the system changes to the state shown in FIG. 19. When the trace bar "C" is being raised, the system assumes the state shown in FIG. 18. Finally, the crossbar associated with stop "IV" is returned to normal and the system goes back to the form shown in FIG. 16.

Figure 20:
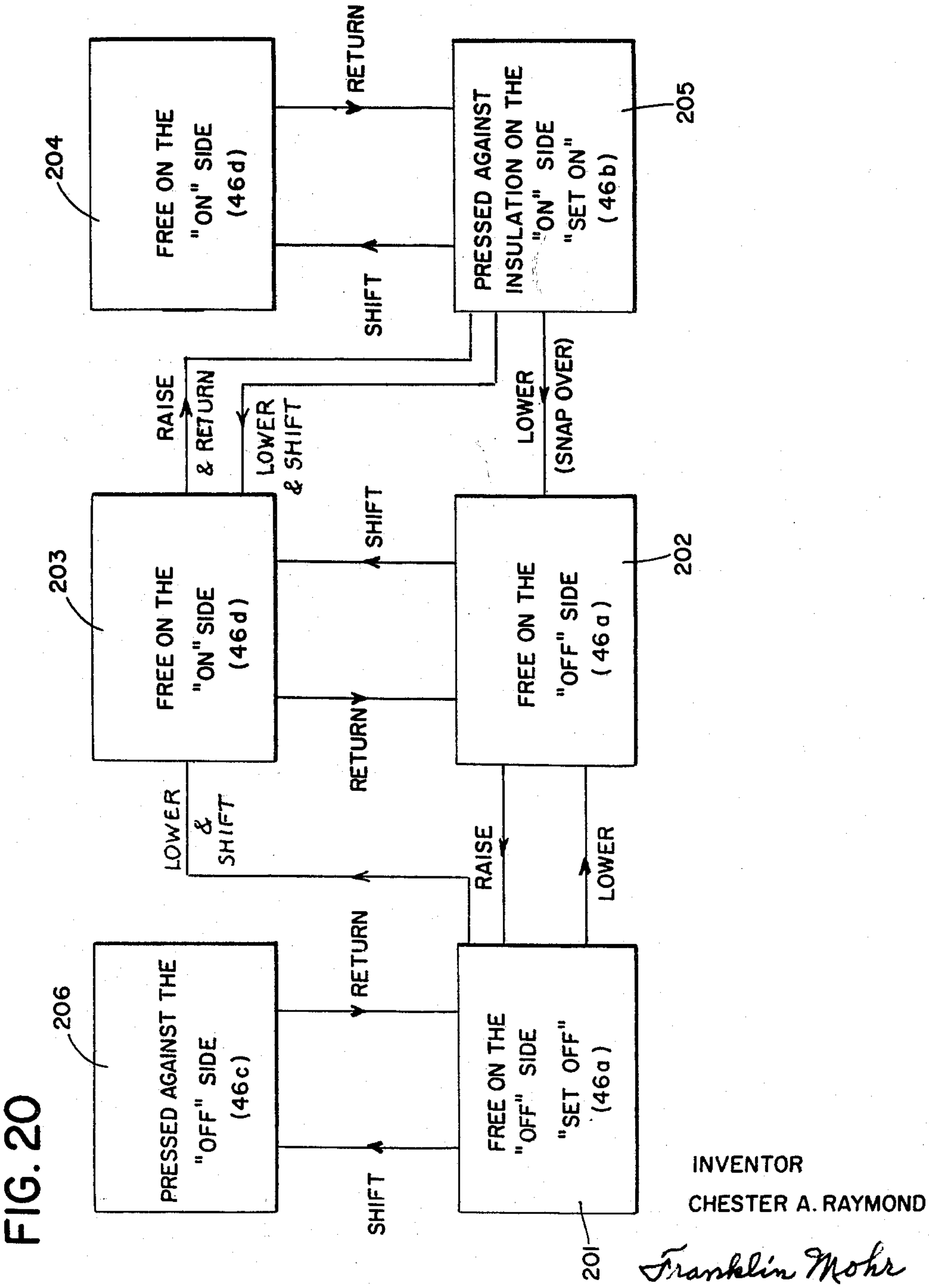
FIG. 20 is a line diagram useful in explaining the steps in the capturing process.

FIG. 20 is a diagram of the various states of the system during the capturing process, together with the steps by which the system may be changed from one state to another. There are six states in all, as denoted by blocks with reference numerals 201 through 206, respectively. Block 201 represents the "set off" state. In this state the forked spring contactor 46 has its tine 61 unflexed and free on the "off" side of the trace bar. The crossbar is in the normal condition and the trace bar is up. This state of the contactor 46 is designated by the reference character *46a*, regardless of whether the trace bar is up or down. When the trace bar is down, the state of the system with the contactor 46 in the state represented by *46a* is the state represented by the block 202.

Block 203 represents a state which may be reached from the state represented by block 202 by means of a shift. In this state the contactor 46 has its tine 61 flexed and free on the "on" side of the trace bar. This state of the contactor 46 has been designated as *46d*.

Block 204 represents a state which is the same as that of block 203 except that the trace bar is up. This state is relevant to trace bar "B." The contactor 46 is free on the "on" side of the trace bar "B" and is designated again as *46d*. In this state, the crossbar is in the shifted condition. Block 205 represents the state that is reached from block 203 by returning the crossbar to the unshifted condition while raising the trace bar "C." The contactor 46 is now pressed against the insulation on the "on" side of the trace bar, and the trace bar is up. This state of the contactor has been designated by *46b*. It can only exist when the trace bar is up, thereby preventing the contactor 46 from springing to the "off" side. The block 205 represents the "set on" condition.

Block 206 represents a state which is reached from the state represented by block 201 by means of a shift. This state is relevant to trace bar "A." The contactor 46 in this state is flexed and is pressed against the "off" side of the trace bar "A," a state which has been designated as *46c*. This state can only exist when the trace bar "A" is up, in which position the trace bar prevents the tine 61 from springing to the "on" side of the trace bar.

In FIG. 20, the various transitions from state to state are graphically illustrated. The transition from "set off" to "set on" for trace bar "C" begins at block 201 and proceeds by lowering the trace bar together with a shift, to block 203; and by raising the trace bar and returning the crossbar to normal, to block 205, which is the "set on" state. The transition from "set on" to "set off" proceeds from block 205, by lowering the trace bar without a shift, to block 202, permitting contactor 46 to snap over to the "off" side; and, by raising the trace bar, changing the system to the state shown in block 201. The transition from "off" to "off," that is, the process whereby a stop initially "set off" is returned to "off" following a capturing operation, proceeds from block 201, by lowering the trace bar without a shift, to block 202; and then, by raising the trace bar, back to block 201. The transition "on" to "on" proceeds from block 205, by a combination of lowering the trace bar and making a shift, to block 203; then by raising the trace bar and returning the crossbar to normal, to block 205.

Contactors 46 associated with piston "A" or "B" that is not involved in the capturing operation which is being performed by piston "C" go through transitions as follows, it being noted that no lowering and raising of the trace bar occurs with a piston that is not involved in the capturing operation. A contactor that is "set on" starts from the state represented by block 205 and if a shift occurs in its associated crossbar, the process takes it to block 204. When the crossbar returns to normal, the process proceeds back to block 205. In the case where no shift of the crossbar occurs, the system remains in the state represented by block 205 throughout the capturing process. A contactor that is "set off" starts from the state of block 201. If a shift occurs, the system goes to the state of block 206, and when the crossbar returns to normal, the system returns to the state of block 201. If no shift occurs, the system remains in the state of block 201 throughout the capturing process.

FIG. 20 also shows diagrammatically how changes in the combination of stops may be made while the piston is depressed even though the desired combination was not set up on the stop tablets before the setter button was pressed. It will be seen that when a trace bar is down, a contactor 46 associated with the trace bar will be in one or the other of the two conditions that have been designated *46a* and *46d*, in FIGS. 17 and 19, respectively. If the crossbar associated with the contactor 46 is in the unshifted position it follows that the contactor is in the state designated *46a*. If, on the other hand, the crossbar is in the shifted position, the contactor is in the state designated *46d*. It will be noted that, when the trace bar 33 is down, the energizing circuit for the crossbar magnet 90 is conditioned by the operated state of the return tie relay 94. Consequently, the crossbar magnet 90 is under the control of the console switch. This switch is in turn under the manual control of the organist at all times. Therefore, by manipulating the stop tablets, the organist may make any changes he wishes in the combination of stops, adding and subtracting stops while he has the trace bar down, and the stops that are finally captured when he releases the manual piston will always be those for which he leaves the stop tablets in the "on" position immediately before he releases the piston.

In terms of the diagram of FIG. 20, when the trace bar is down and the contactor 46 is associated with a stop tablet that is in the "on" position, the associated crossbar is shifted and the contactor 46 is in the state designated *46d*. The system of FIG. 20 as a whole is in the state 203. If the stop tablet is now manually shifted to the "off" position, the crossbar returns to normal and the contactor 46 assumes the state designated *46a*. The system as a whole is then in the state 202. If the trace bar is now raised, the system goes into the state 201, which is the "set off" state. As there was no shift involved, the system remains in the "set off" state. Conversely, when the trace bar is down and the contactor 46 is associated with a stop tablet that is in the "off" position, the associated crossbar is in the unshifted state and the contactor 46 is in the state designated *46a*. The system as a whole is in the state 202. If the stop tablet is now manually shifted to the "on" position, the crossbar is shifted and the contactor assumes the state designated *46d*. The system as a whole is now in the state 203. If the trace bar is then raised, the system goes into the state 205 and when the crossbar returns to normal, the system stays in the state 205, which is the "set on" state.

FIG. 21 shows in bottom plan view and on an enlarged scale a preferred form of crossbar 48. This comprises a tube of metal of circular cross-section having a longitudinal slot 75 extending from a point near one end of the tube to a point near the other end, leaving a substantial fully circular portion at each end to insure rigidity of the structure against twisting or crushing. The slot 75 may be made as by a milling operation. The slots 52 are slightly elongated or elliptical and are located in a longitudinal line diametrically opposite to the slot 75. The breadth of the slot 75 and of the slots 52 is slightly greater (e.g., 0.003 inch greater) than the thickness of the shank portion 50 of the contactor 46. In place in the assembly of the invention, the cross-bar 48 is mounted with the slot 75 downward and the slots 52 at the top. The elongation of the slot 52 permits the contactor 46 to rotate about a horizontal axis and at the same time to slide slightly as the crossbar is shifted. The slot 75 guides the shank 50 while permitting free flexing of the shank 50 and tine 61. The snugness of fit of the contactor in the slots 52 and 75 insures a good electrical contact at one or more points along the edges of the slots. FIG. 21 shows the biasing spring 64, pin 66, and slot 81 to which references have been made hereinabove.

FIG. 22 shows a preferred type of an adjustable mechanical coupling between an insulating coupling strip 91 and the crossbar 48. A U-shaped, strip-like metallic spring clip 76 has one end frictionally engaged in a slit 77 in the upper end of the strip 91. The clip 76 has holes at 78 and 79 into which the crossbar 48 fits snugly. The position of the clip 76 longitudinally of the crossbar 48 may be readily adjusted by slightly flexing the clip to bring the arms of the U closer together while moving it along the crossbar. In this manner the mechanical coupling between the magnet 90 and the crossbar 48 may be adjusted to regulate the shifting movement of the crossbar. This coupling arrangement is an improvement over the conventional use of leather buttons mounted upon threaded metal rods to form readily adjustable mechanical couplings in organs and control devices for organs. When motion is imparted to the strip 91 in the direction of the arrow in FIG. 22, the arms of the U are spread apart slightly, thereby increasing friction between the clips 76 and the crossbar 48.

FIG. 23 shows an alternative arrangement for a portion of the system of FIG. 1 in which the crossbar magnets 90 are eliminated and instead the "off" coils 118 are provided each with an auxiliary armature which makes it possible to make double use of the "off" coil to take over the function of the crossbar magnet. At the same time the arrangement provides a direct mechanical coupling between the console stop action unit and the associated crossbar. Consequently, the control system of FIG. 1 as modified in accordance with FIG. 23 may be mounted at the console, e.g., behind the name board, thereby eliminating a large amount of wiring which would be necessary if the control system were placed in a remote location away from the console.

An auxiliary armature 163 is mounted upon the portion 114 of the main armature 110 by means of a pivot 164 at one end of the armature 163. The pivot 164 works in a slot *164a*. At a point 165 near the other end of the armature 163 a pull rod 175 is secured, the other end of the rod 175 being mechanically fastened to one end of a crossbar 48 through an insulating link 176. The slot *164a* is made sufficiently long to permit the pivot 164 to move without deforming the rod 175. The armature 163 and slot *164a* are so designed that when the armature 110 is in the "on" position and the "off" coil 118 is energized, the armature 163 is firmly held against the pole piece *118a* by magnetic attraction, as shown in sectional view FIG. 24. When the armature 163 is held against the pole piece *118a*, most of the flux of coil 118 passes through the armature 163 thereby substantially preventing the coil 118 from moving the main armature 110 in case the circuit of the coil 116 should be broken.

The crossbar 48 in FIG. 23 is shown in the unshifted position. All the crossbar magnets 90 of FIG. 1 are omitted in the system of FIG. 23 as they are not needed in this embodiment.

In the system of FIG. 23, the energizing circuit of the "off" coil 118 differs from that shown in FIG. 1 in that one end of the winding of the "off" coil is directly connected to the frame 108. The other end of this winding is connected by the lead 71 as in FIG. 1 to contact 69 of switch 65. Contact 67, instead of being electrically connected directly to the frame 108 as in FIG. 1 is insulated therefrom. A lead *71a* from the contact 67 is connected to the contact 168 of the "off" relay 160.

The connections to the return tie relay 94 are somewhat modified as shown in FIG. 23 in which the movable contacts 97, 100, 100, 100 shown in FIG. 1 are renumbered 173, 174, 182, 183 and the fixed contacts 98, 99, 99, 99 are renumbered 177, 180, 185, 187. The holding circuit contacts 192, 194 remain as shown in FIG. 1. As in the embodiment shown in FIG. 1, the relay 94 serves all the console stop action units. The movable contacts 173, 174, 182, 183 and 194 are connected in common to a negative terminal 126. The fixed contact 177 is connected by a lead 181 to the lead 158 of the "on" coil 116. Contact 180 is connected by a lead 179 to the lead 71 and winding of coil 118. Contact 185 is for connection to the "on" coil of another console stop action unit and contact 187 is for connection to the "off" coil of the other console stop action unit. As many pairs of contacts may be provided as are necessary to serve the number of console stop action units that are required.

On the setting side, when the setter button is pressed, the magnet 150 is energized thereby unlocking the trace bars and closing the switch 139 as in the system of FIG. 1. Then, if a manual piston is operated, the slider 35 contacts a holding contactor 146 thereby closing the energizing circuit of relay 94 as in the system of FIG. 1. The activation of relay 94 now does two things substantially simultaneously. It closes an energizing circuit for the "on" coil 116 from a positive terminal 124 over lead 130, coil 116, lead 181, and contacts 177 and 173 to a negative terminal 26. The relay 94 also closes an energizing circuit for the "off" coil 118 from a positive terminal 124 over lead 130, frame 108, coil 118, lead 179, and contacts 180 and 174 to a negative terminal 126.

Since both the "on" coil 116 and the "off" coil 118 are energized substantially simultaneously when relay 94 is actuated, the armature 110 remains in whichever position it is in when the relay is actuated.

In the case when the tablet 193 is in the "on" position, the "off" coil attracts the auxiliary armature 163 causing the latter to pivot upon the pivot 164 and pull upon the rod 175, thereby shifting the crossbar 48 against the force of the spring 64.

In the case when the tablet 193 is in the "off" position, the armature 110 receives the bulk of the magnetic flux from the pole piece 118*a* so that the auxiliary armature 163 is not attracted and no shift of the crossbar 48 is produced.

Thus, it will be seen that in the arrangement of FIG. 23 the shifting of the crossbar 48 and the consequent adding or subtracting of a stop is under the control of the console stop action unit as is also the case in the arrangement of FIG. 1.

On the operating side, the system operates the same as does the system of FIG. 1, except that in the case of a stop that is "set on," energization of the "off" coil 118 when the armature 110 is in the "on" position causes the auxiliary armature 163 to pull over, thereby shifting the crossbar 48 and possibly opening the contacts between the "set on" contactors 46 and the slider 35 at a time when a shift is not desired. This may de-energize the "on" coil 116 of any console stop action unit for which the stop is "set on," and thus tend to cause the console switch to be shifted to the "off" position. However, due to the magnetic shunting effect or the mechanical blocking effect of the armature 163 which is now interposed between the pole piece 118*a* and the main armature 110 as shown in FIG. 24, the console switch will remain on. As soon as the manual piston is released, the "off" relay is de-energized, in turn de-energizing the "off" coil and permitting the crossbar 48 to return to the unshifted position. The console switch continues in the "on" position.

It will be noted that energization of the "off" coil 118 when the armature 110 is in the "off" position does not result in attraction of the auxiliary armature 163.

FIG. 25 shows the general physical organization of a preferred embodiment of the invention, comprising entirely separable parts 301 and 302. The upper part 301 contains the entire assembly exclusive of the piston magnets 70 and wiring therefor. The general lay-out of part 301 comprises cross supports such as 303 upon which the support members 31 rest. The side members 304 and 305 are channel-like members, preferably of aluminum. Supported upon either the cross support 303 or the side members 304 and 305 are insulating members 306 and 307 which support the crossbars 48. The members 306 and 307 may be made, for example, of thermosetting plastic material. The side members 304 and 305 afford convenient support for crossbar magnets 90 in a remote control application. The lower part 302 comprises a base member 308 and side members 309 and 310, which may be made, for example, of wood. The part 302 preferably contains only the plurality of magnets 70 together with the necessary wiring thereto, coming from the organ console. All other wiring from the organ console and from the organ goes to the upper part 301. The magnets 70 are so placed in the part 302 that when the parts 301 and 302 are put together with the hollow parts of the side members 304 and 305 embracing the respective side members 309 and 310, the driving part 80 of each magnet 70 is in operative relationship with the bearing surface 56 of the tongue 55 of a respective one of the sliders 35. The parts 301 and 302 may be separated at any time by merely lifting the part 301. There is no wiring between the parts 301 and 302, and no permanent physical connection. In the upper part 301, the channel members 304, 305 and the insulating members 306, 307 provide ample convenient space for wiring and interconnections. The wiring from the console to the parts 301, 302 may be provided by means of two separate cables, and wiring from the organ to the part 301 may be in a third cable.

The forked spring contactors 46 are easily inserted between the crossbars and the support members 31 by slightly bending the contactor as at flattened portion 84 and inserting the shank 50 and the prong 61 in the respective holes 52 and 59 as shown in FIG. 3. Any contactor 46 is quickly and easily removable by means of a slight pull. No soldered connections are required in the installation of the contactors.

Although the console stop action unit 106 has been described and shown as consisting of electromagnetic and mechanical components, it will be understood that pneumatic components may also be included or substituted to obtain an equivalent over all effect.

While an illustrative form of the invention has been described and shown herein, it will be understood that numerous changes may be made without departing from the general principles and scope of the invention.

What is claimed is:

1. In a capture-type combination action, in combination, a support member, an insulating member secured to said support member, a trace bar slidably mounted upon said support member, a slider mounted upon said trace bar, means for moving said trace bar relatively to said support member, means for moving said slider relatively to said trace bar, a manual piston for jointly controlling both of said moving means, a cross member slidably supported transversely with respect to said trace bar and spaced apart therefrom, driving means for said cross member, a bistable switch for controlling motion of said cross member driving means, an armature for shifting said switch between an "on" position and an "off" position, an "on" coil for moving said armature in such manner as to place the switch in the "on" position, an "off" coil for moving said armature in such manner as to place the switch in the "off" position, lock means for said trace bar, a setter button for controlling said lock means, a forked spring contactor having a shank portion carried by said cross member, a first tine of said contactor being secured to said insulating member, a second tine of said contactor being positioned adjacent to and in operative relationship to said trace bar, a holding circuit for controlling said lock means independently of said setter button, said holding circuit including a holding contact mounted in operative relationship to said slider, whereby motion of said slider under the control of said piston serves to establish an electrical connection between said holding contact and said slider thereby energizing said holding circuit and enabling said setter button to be released after said piston is depressed.

2. In a console stop action unit for an organ, in combination, a bistable switch mechanism having a stable "on" position and a stable "off" position, said switch mechanism including a main armature for use in shifting said switch mechanism from one said position to the other, an electromagnetic "on" coil operatively associated with said armature for shifting said switch mechanism into said "on" position, an electromagnetic "off" coil operatively associated with said armature for shifting said switch mechanism into said "off" position, an auxiliary armature operatively associated with said "on" coil, a control circuit for said "off" coil, and means controlled by said auxiliary armature tending to open the said control circuit of the "off" coil when said "on" coil is energized, said main armature and said auxiliary armature being so arranged that the main armature receives substantially all the flux from the "on" coil when the said switch is in the "on" position, thereby preventing opening of said "off" coil control circuit while said switch is in the "on" position.

3. In a console stop action unit, in combination, a bistably mounted main armature having a stable "on" position, a stable "off" position, and an unstable intermediate or central position, an electromagnetic "on" coil operatively associated with said armature for moving said armature into the "on" position, an electromagnetic "off" coil operatively associated with said armature for moving said armature into the "off" position, manual means for moving said armature from either stable position through said central position into the other stable position, means for simultaneously energizing both the "on" coil and the "off" coil, and an auxiliary armature operatively associated with the "off" coil for moving an element of a combination stop action device in response to current in said "off" coil while said main armature is in the "on" position, said main armature and said auxiliary armature being so arranged that the main armature receives substantially all the flux from the "off" coil when the main armature is in the "off" position, thereby preventing attraction of the auxiliary armature when the main armature is in the "off" position.

4. Apparatus in accordance with claim 3, together with mechanical coupling means attached to the said auxiliary armature for direct mechanical connection to the said element to be moved.

5. Apparatus according to claim 3, in which the said auxiliary armature is supported by a pivot mounted upon said main armature, said pivot being positioned in a slot in said auxiliary armature.

6. Apparatus in accordance with claim 3, together with a trace bar for performing a setting operation in conjunction with said auxiliary armature, means for shifting and returning said trace bar with respect to a normal position, means operative after the shifting of the trace bar to actuate the said simultaneous energizing means for the respective "on" and "off" coils, whereby shifting or non-shifting of the said element of a combination stop action device is effected, means operative after returning said trace bar to normal position, said last-mentioned means being effective to de-energize simultaneously the said "on" coil and the said "off" coil, manually operable electromagnetic means for locking and unlocking said trace bar shifting and returning means, and a holding circuit for maintaining said locking and unlocking means in the unlocked condition during the shifting and returning of the trace bar.

7. In a console stop action unit, in combination, a bistably mounted main armature having a stable "on" position, a stable "off" position, and an unstable intermediate or central position, an electromagnetic "on" coil operatively associated with said armature for moving said armature into the "on" position, an electromagnetic "off" coil operatively associated with said armature for moving said armature into the "off" position, a pole piece for said "off" coil, manual means for moving said armature from either stable position through said central position into the other stable position, an auxiliary armature supported by a pivot mounted upon said main armature, said pivot being positioned in a slot in said auxiliary armature, and said auxiliary armature being operatively associated with the "off" coil for moving an element of a combination stop action device in response to current in said "off" coil while said main armature is in the "on" position, said main armature, said auxiliary armature and said "off" coil being so arranged that when the main armature is on the "on" position and the "off" coil is energized, the said auxiliary armature is held firmly against the pole piece of the "off" coil and the said pivot frictionally engages the side of said slot, thereby preventing motion of the main armature away from its "on" position while said auxiliary armature is attracted by said "off" coil.

8. In a capture-type combination action,
in combination,
a slidably mounted trace bar,
a slider frictionally mounted upon said trace bar and tending to move as a unit therewith,
biasing means urging said slider toward a normal position upon said trace bar and urging said trace bar toward a normal position upon a fixed support,
means to move said trace bar and said slider as a unit against said biasing means toward positions away from said respective normal positions,
and a lock member blocking the path of said last mentioned motion of said slider and movable into and out of the path of said trace bar,
said moving means for said trace bar and slider being effective when said lock member is in the path of said trace bar to move said slider relatively to said trace bar against friction and said biasing means into contact with said lock member.

9. In a capture-type combination action,
in combination,
a trace bar,
a cross member slidably mounted transversely with respect to said trace bar and spaced apart therefrom,
and a forked spring contactor having a shank portion flexibly supported by said cross member in the neighborhood of said trace bar,
said contactor having a first tine positioned in the neighborhood of said trace bar and fixedly supported relatively thereto,
and said contactor having a second tine positioned adjacent to said trace bar,
whereby relative motion of said cross member and said trace bar flexes said contactor, thereby altering the relationship between said second tine and said trace bar.

10. Apparatus according to claim 9, in which said cross member comprises a hollow metal tube having at least one slot therein with substantially parallel sides for engaging the shank portion of said forked spring contactor and in which said contactor is of rectangular cross-section substantially filling the width of said slot to substantially prevent rotary motion of said contactor in the slot.

11. In a capture-type combination action,
in combination,
a trace bar,
electrically actuated lock means for locking and unlocking said trace bar,
an electrically conductive slider mounted upon said trace bar,
means for selectively moving said slider over one or the other of two paths depending upon whether said trace bar is locked or unlocked,
manual means for actuating said slider moving means,
setting means for electrically energizing said lock means,
and an electrical holding circuit for energizing said lock means independently of said setting means,
said holding circuit including a holding contact mounted in the said path followed by said slider when said trace bar is unlocked,
whereby motion of said slider under the control of said manual means when said trace bar is unlocked serves to establish an electrical connection between said holding contact and said slider,
thereby energizing said holding circuit and enabling said setting means to be released after said manual means has actuated said slider moving means.

12. Apparatus according to claim 9, in which the said trace bar is provided with a longitudinally extending insulating portion containing a hole or socket for receiving and supporting a said first tine of a said forked spring contactor.

13. Apparatus according to claim 10, in which the said cross member has a plurality of relatively short slots at the top and a single long slot at the bottom, said bottom slot extending from near one end of the cross member to near the other end, leaving unslotted portions at both ends of the cross member to promote rigidity.

14. In a capture-type combination action, in combination, a plurality of trace bars, a plurality of cooperating cross members, and a plurality of forked spring contactors each having a shank portion flexibly supported by a said cross member and each said cross member flexibly supporting a plurality of said forked spring contactors, the group of contactors supported by a given cross member each having one tine fixedly supported relatively to a different one of said trace bars, and each said contactor having a second tine positioned adjacent to the respective trace bar, whereby relative motion of any said cross member with respect to the said trace bars flexes simultaneously the plurality of contactors flexibly supported by said cross member.

15. Switching means for a capture-type combination action of the kind having a trace bar and a crossbar arranged for transverse relative motion,
said switching means comprising
a relatively fixed insulating bar mounted generally parallel to said trace bar, and
a forked spring contact member having a shank portion supported by said crossbar and one tine supported by said fixed insulating bar, a second tine being positioned adjacent to said trace bar in operative switching relationship thereto.

16. Switching means for a capture-type combination action of the kind having a trace bar and a crossbar arranged for transverse relative motion,
said switching means comprising
a relatively fixed insulating bar mounted generally parallel to said trace bar,
a conductive slider mounted upon said trace bar,
said crossbar being electrically conductive, and
a forked spring contact member having a shank portion supported in electrical contact with said crossbar,
one tine of said forked contactor being secured to said insulating bar,
and another tine of said forked contactor being positioned in operative switching relationship to said conductive slider.

17. Switching means for a capture-type combination action of the kind having a trace bar and a crossbar,
said switching means comprising
a fixed supporting bar,
a forked spring contact member having a shank portion supported by said crossbar and one tine secured to said supporting bar, and
means to move said crossbar transversely to said trace bar, thereby to flex said forked spring member to change the position of a second tine of the forked member to perform a switching function.

18. Apparatus according to claim 17, in which said means to move said crossbar is a source of mechanical driving force and said crossbar is a rod-like member, together with a U-shaped resilient coupling member coupled to said source of mechanical driving force and having a pair of substantially aligned holes therein located in opposite arms of the U, the edges of which holes frictionally engage said crossbar, said coupling member being manually adjustable in position along said crossbar.

19. In a capture-type combination action,
in combination,
a trace bar,
electrically actuated lock means for locking and unlocking said trace bar,
an electrically conductive slider mounted upon said trace bar,
means for selectively moving said slider over one or the other of two paths depending upon whether said trace bar is locked or unlocked,
said means serving also to move said trace bar when the latter is unlocked,
manual means for actuating said slider moving means,
a cross member slidably mounted transversely with respect to said trace bar and spaced therefrom,
electrically actuated means for imparting forward and return sliding motion to said cross member,
an electrical conditioning circuit for said cross member sliding means,
said conditioning circuit including a holding contact mounted in the said path followed by said slider when said trace bar is unlocked,
whereby motion of said slider under the control of said manual slider actuating means when said trace bar is unlocked controls said elctrical conditioning circuit for said cross member,
thereby substantially preventing said return motion of said cross member while said trace bar is in motion.

References Cited in the file of this patent

UNITED STATES PATENTS

| | | |
|---|---|---|
| 1,349,820 | Depue | Aug. 17, 1920 |
| 1,462,429 | Verlinden | July 17, 1923 |
| 2,178,151 | Wagar | Oct. 31, 1939 |
| 2,255,543 | Fisher | Sept. 9, 1941 |
| 2,434,740 | Glaser et al. | Jan. 20, 1948 |
| 2,598,456 | Snyder | May 27, 1952 |
| 2,612,810 | Kent | Oct. 7, 1952 |
| 3,060,784 | Holt | Oct. 30, 1962 |